(12) United States Patent
Kim et al.

(10) Patent No.: US 9,832,457 B2
(45) Date of Patent: Nov. 28, 2017

(54) AUTOSTEREOSCOPIC 3D IMAGE DISPLAY DEVICE FOR FLATTENING VIEWING ZONE AND MINIMIZING DYNAMIC CROSSTALK

(75) Inventors: Sung Kyu Kim, Seoul (KR); Ki Hyuk Yoon, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 537 days.

(21) Appl. No.: 14/375,633

(22) PCT Filed: Aug. 8, 2012

(86) PCT No.: PCT/KR2012/006271
§ 371 (c)(1),
(2), (4) Date: Jul. 30, 2014

(87) PCT Pub. No.: WO2013/115444
PCT Pub. Date: Aug. 8, 2013

(65) Prior Publication Data
US 2015/0015681 A1    Jan. 15, 2015

(30) Foreign Application Priority Data
Feb. 2, 2012 (KR) .......... 10-2012-0010900

(51) Int. Cl.
*H04N 13/04* (2006.01)
*G02B 27/22* (2006.01)
*G02B 27/00* (2006.01)

(52) U.S. Cl.
CPC ..... *H04N 13/0402* (2013.01); *G02B 27/2214* (2013.01); *H04N 13/0409* (2013.01);
(Continued)

(58) Field of Classification Search
CPC .................. H04N 13/0402; G02B 27/0093
See application file for complete search history.

(56) References Cited

U.S. PATENT DOCUMENTS

| | | | |
|---|---|---|---|
| 2003/0058209 A1* | 3/2003 | Balogh | G02B 27/2214 345/87 |
| 2005/0057807 A1* | 3/2005 | Takagi | H04N 13/0404 359/462 |

(Continued)

FOREIGN PATENT DOCUMENTS

| | | |
|---|---|---|
| EP | 0744872 A2 | 11/1996 |
| GB | 2296617 A | 7/1996 |

(Continued)

OTHER PUBLICATIONS

Extended European Search Report Appln. No. M/KIS-071-WO-EP; dated Dec. 4, 2015.

(Continued)

*Primary Examiner* — Mehrdad Dastouri
*Assistant Examiner* — Rowina Cattungal
(74) *Attorney, Agent, or Firm* — Ladas & Parry LLP; Loren K. Thompson

(57) ABSTRACT

The present invention relates to a 3D image display device and includes an image display panel for displaying a 3D image, a control unit for controlling a viewpoint image, and a viewer position tracking system for determining the position of a viewer's pupil and transmitting positional information to the control unit, wherein the image display panel provides multiple viewpoints such as four or more viewpoints, and the intersection of the viewing zone for any one of the multiple viewpoints with the field of view of an adjacent viewpoint is at least 85% of the maximum brightness of one viewpoint.

14 Claims, 23 Drawing Sheets

(52) U.S. Cl.
CPC ..... *H04N 13/0447* (2013.01); *H04N 13/0468* (2013.01); *G02B 27/0093* (2013.01)

(56) References Cited

U.S. PATENT DOCUMENTS

| | | | |
|---|---|---|---|
| 2008/0218855 A1* | 9/2008 | Van Berkel | H04N 13/0404 359/463 |
| 2010/0182688 A1* | 7/2010 | Kim | G02B 27/0093 359/465 |
| 2011/0001803 A1* | 1/2011 | De Zwart | H04N 13/0415 348/51 |
| 2011/0285700 A1* | 11/2011 | Kim | G02B 27/0093 345/419 |

FOREIGN PATENT DOCUMENTS

| | | |
|---|---|---|
| JP | 2004-347727 A | 12/2004 |
| KR | 20100085753 A | 7/2010 |
| KR | 20120002145 A | 1/2012 |
| WO | 2007031931 A2 | 3/2007 |
| WO | 2007069195 A2 | 6/2007 |
| WO | 2009101558 A1 | 8/2009 |

OTHER PUBLICATIONS

European Search Report Appln. No. 12867103.9-1562/28711746 PCT/KR2012006271; dated Aug. 4, 2015.
International Search Report dated Dec. 21, 2012; PCT/KR2012/006271.

* cited by examiner

Simulation of Parallax Barrier (4 Viewpoints)

Simulation of Parallax Barrier (4 Viewpoints)

FIG. 22A

| TOTAL NUMBER OF VIEWPOINTS | DISTANCE BETWEEN VIEWPOINTS | MINIMUM APERTURE WIDTH/PIXEL WIDTH | MAXIMUM APERTURE WIDTH/PIXEL WIDTH |
|---|---|---|---|
| 4 | 32.5 | 1.6 | 3.2 |
| 6 | 21.67 | 1.6 | 5 |
| 8 | 16.25 | 1.6 | 7.2 |
| 10 | 13 | 1.6 | 9.1 |
| 12 | 10.83 | 1.6 | 11 |
| 14 | 9.29 | 1.6 | 12.8 |
| 20 | 6.5 | 1.6 | 18.8 |

VERTICAL PARALLAX BARRIER

FIG. 22B

| TOTAL NUMBER OF VIEWPOINTS | MINIMUM APERTURE WIDTH/PIXEL WIDTH | MAXIMUM APERTURE WIDTH/PIXEL WIDTH |
|---|---|---|
| 4 | 1.8 | 2.6 |
| 6 | 1.8 | 4.7 |
| 8 | 1.8 | 6.6 |
| 10 | 1.8 | 8.5 |
| 12 | 1.8 | 10.4 |
| 14 | 1.8 | 12.4 |
| 20 | 1.8 | 18.4 |

INCLINED PARALLAX BARRIER
$\operatorname{atan}(1/3) \sim 18.43$ DEGREES

FIG. 24

| TOTAL NUMBER OF VIEWPOINTS | DISTANCE BETWEEN VIEWPOINTS | MINIMUM LINE LIGHT SOURCE WIDTH/PIXEL WIDTH | MAXIMUM LINE LIGHT SOURCE WIDTH/PIXEL WIDTH | d | W(LS) |
|---|---|---|---|---|---|
| 4 | 32.5 | 1.6 | 3.2 | 4.6296 | 0.40123 |
| 6 | 21.67 | 1.6 | 5.2 | 6.9541 | 0.60278 |
| 8 | 16.25 | 1.6 | 7.2 | 9.2879 | 0.80495 |
| 10 | 13 | 1.6 | 9.2 | 11.6279 | 1.0078 |
| 12 | 10.83 | 1.6 | 11.1 | 13.9795 | 1.2112 |
| 14 | 9.29 | 1.6 | 13.2 | 16.3221 | 1.45152 |
| 20 | 6.5 | 1.5 | 19.2 | 23.4375 | 2.0313 |

| TOTAL NUMBER OF VIEWPOINTS | DISTANCE BETWEEN VIEWPOINTS | (1) f<fo | | (2) f>fo | |
|---|---|---|---|---|---|
| | | f/fo(min) | f/fo(max) | f/fo(min) | f/fo(max) |
| 4 | 32.5 | 0.55 | 0.72 | 1.63 | 4.88 |
| 6 | 21.67 | 0.54 | 0.78 | 1.34 | 6.5 |
| 8 | 16.25 | 0.52 | 0.83 | 1.24 | 9.75 |
| 10 | 13 | 0.51 | 0.86 | 1.17 | 11.05 |
| 12 | 10.83 | 0.51 | 0.88 | 1.14 | 13 |
| 14 | 9.29 | 0.506 | 0.89 | 1.11 | 13.93 |
| 20 | 6.5 | 0.5 | 0.92 | 1.06 | 20.8 |

MULTI-VEIWPOINT (16 VIEWPOINTS) – CASE IN WHICH DISTANCE BETWEEN VIEWPOINTS IS TWO-VIEWPOINT

AUTOSTEREOSCOPIC 3D IMAGE DISPLAY DEVICE FOR FLATTENING VIEWING ZONE AND MINIMIZING DYNAMIC CROSSTALK

TECHNICAL FIELD

The present invention relates to an autostereoscopic three-dimensional (3D) image display device, and more particularly, to a 3D image display device that can dynamically minimize crosstalk at a viewer's pupils and minimize change in brightness of a 3D image even when the viewer is moving, by flattening a viewing zone brightness distribution of a viewpoint image generated by arranging a parallax barrier, which is an optical plate for forming a viewing zone, a lenticular lens, or a line light source, overlapping a flattened viewing zone of an adjacent viewpoint, tracking a viewer's position in real time, providing viewpoint images at viewpoints of the viewer's pupils, and removing an adjacent viewpoint image.

BACKGROUND ART

Autostereoscopic 3D image display devices are classified into a type using an optical plate, such as a lenticular lens or parallax barrier, and a type using a line light source array for forming a viewing zone. However, in conventional 3D image display devices using the parallax barrier, the lenticular lens, and the line light source array for forming the viewing zone, brightness of a corresponding viewpoint image varies with movement of eyes even in the same viewing zone, and also crosstalk, which is partial overlap of an image of an adjacent viewpoint, occurs. Accordingly, it is difficult to implement a natural 3D image when a viewer moves, thereby causing viewer inconvenience.

FIG. 1 shows a brightness distribution of viewing zones for viewpoints according to horizontal position movement of the conventional autostereoscopic 3D image display device using the parallax barrier at an optimal viewing position. In FIG. 1, on the assumption that a distance between viewpoints is the same as a distance between a viewer's pupils (about 65 mm), when the viewer at the optimal viewing position is positioned in front of the 3D image display device, the left eye of the viewer is positioned at a center of a first viewing zone (position A), and the right eye of the viewer is positioned at a center of a second viewing zone (position C), an image in the corresponding viewing zone of each viewpoint becomes dark rapidly as both of the viewer's eyes deviate from the position A and the position C, thereby degrading image quality. Further, a portion of an image disposed in the first viewing zone and a portion of a right eye image disposed in the third viewing zone are simultaneously viewed by the left eye of the viewer, and a portion of a left eye image disposed in the second viewing zone and a portion of an image disposed in a fourth viewing zone are simultaneously viewed by the right eye of the viewer. Accordingly, a certain amount of crosstalk occurs even at the optimal position, and the amount thereof increases when the viewer leaves the optimal position. In particular, when the left eye of the viewer is positioned at a middle position (position B) between the first viewing zone and the second viewing zone, and the right eye of the viewer is positioned at a middle position between the second viewing zone and the third viewing zone, the maximum crosstalk occurs. Further, since the distance between viewpoints is designed to be appropriate for a distance between an average viewer's pupils even when the viewer stops, left and right optimal bright images cannot be viewed in the brightness distribution of the viewing zone of FIG. 1 when a distance between the pupils of a viewer who views a 3D image deviates from the average.

The above problems occur in the conventional autostereoscopic 3D image display device when the viewer views the 3D image at a position near the optimal viewing position while stopping or moving. In addition, basically, when moving in a depth direction, the viewer cannot view the 3D image well. This will be described with reference to FIGS. 2 to 5.

FIGS. 2 to 5 are diagrams for describing an example of a conventional autostereoscopic 3D image display device using a four-viewpoint parallax barrier. The viewing zones are separated well at the optimal viewing position as shown in FIG. 1. However, for example, if a viewer leaves the optimal viewing distance (OVD) position in a depth direction and moves toward a position P1 (position at a distance of 0.5 times the OVD), unlike the OVD, a viewing zone for a left eye viewing point and a viewing zone for a right-eye viewing point are not separated well and each of the viewing zone overlaps adjacent viewing zone. Accordingly, the viewer cannot view a 3D image well (see FIG. 4 with respect to a viewing zone distribution at the position P1). Here, since the viewing zones for respective apertures do not accurately match, adjacent viewing zones are represented as overlapping. FIG. 4 shows a result of measuring all images for the same viewpoint together. That is, a viewing zone for an individual aperture does not expand individually. This result may be seen in FIGS. 7 and 8, which show viewing zone distribution charts for an individual aperture. The individual aperture defining the viewing zone distribution charts is defined as a 3D pixel line. The 3D pixel line may be a cylindrical lens for a lenticular type or a line light source for a line light source type. In addition, the result of FIG. 4 analytically shows that the amount of crosstalk is great. Also, although not shown in FIG. 2, even when the viewer moves to a position at a distance 1.5 times the OVD, as shown in FIG. 5, a viewing zone shape varies for a similar reason to that of FIG. 4 and crosstalk increases. To describe this in more detailed with reference to FIG. 4, considering the intersection of boundaries between viewing zones within a dotted line of a position P1 of FIG. 2, when a pupil is positioned at a depth position of the position P1, for example, a position e1, a 3D image may be viewed near the center of the third viewing zone through a central aperture, but a 3D image from a left side aperture is positioned on a boundary between the first viewing zone and the second viewing zone such that the 3D image causes the viewer to experience maximum crosstalk. Also, although a 3D image from a right side aperture is not exactly shown in the drawings, since the 3D image is positioned at a boundary between the fourth viewing zone and a first viewing zone in a sub viewing zone, the 3D image allows a viewer to experience maximum crosstalk and an inverse viewing zone. Accordingly, even when there is one pupil at a center of a viewing zone of any one pixel in consideration of all apertures, there are multiple cases in which one pupil is on a barrier between viewing points even when the viewing zone closest to the center of the pupil is selected among viewing zones of other apertures, depending on the case. In this case, as described above, the crosstalk is completely or approximately maximized for each aperture. Accordingly, the crosstalk increases on average. This situation occurs even when the distance is far from the optimal viewing position. Accordingly, if the viewer is sufficiently far from the optimal viewing position, a large amount of crosstalk inevitably occurs at all positions.

Lastly, the conventional autostereoscopic 3D image display device is generally designed such that one viewer may view a 3D image. For a plurality of viewers, the autostereoscopic 3D image display device may allow only viewers positioned at restricted positions, that is, specific positions within the optimal viewing position, to view a 3D image at their positions.

Accordingly, there is a demand for an autostereoscopic image display device for viewing a natural 3D image even when a plurality of viewers move freely as a solution for the above-described problems.

DISCLOSURE

Technical Problem

It is an object of the invention to provide an autostereoscopic 3D image display device with which a 3D image can be viewed without special glasses such as polarization glasses or shutter glasses, and which can minimize change in brightness of a 3D image that occurs in conventional autostereoscopic 3D image display devices when a viewer moves and reduce crosstalk of viewpoint images of both of the viewer's eyes to a level of a glasses-type 3D image display device or less.

It is another object of the invention to overcome a limitation of a position in which a viewer can view an optimal 3D image, which is a problem in conventional autostereoscopic 3D image display devices, unlike the glasses-type 3D image display device. In particular, even when the viewer moves in a distance direction (depth direction) of the 3D image display device, the present invention allows the viewer to view a 3D image having the same image quality as in the designed optimal viewing position.

It is still another object of the invention to allow a plurality of viewers to continuously view natural 3D images while the plurality of viewers move in three dimensional directions including a depth direction in order to solve problems of providing the optimal 3D image to only one viewer or a plurality of viewers having an extremely limited range of motion, which is a limitation in conventional autostereoscopic 3D image display devices.

Technical Solution

One aspect of the present invention provides a 3D image display device including an image display panel configure to display a 3D image, a control unit configured to control a viewpoint image, and a viewer position tracking system configured to determine a position of a pupil of a viewer and deliver positional information to the control unit, wherein the image display panel provides multiple viewpoints such as four or more viewpoints, and an intersection point between a viewing zone of any one of the multiple viewpoints and a viewing zone of an adjacent viewpoint has 85% or more of a maximum brightness of one of the viewpoints.

Light in a viewing zone of any one of two viewpoints closest to centers of both of the viewer's eyes may intervene in 5% or less of a maximum brightness at a center of a viewing zone of the other viewpoint.

The image display panel may display the 3D image by using a parallax barrier, a lenticular lens, or a line light source serving as a parallax separation means.

When the parallax separation means is the parallax barrier and N-1 viewpoint centers are spaced a certain distance between two binocular viewpoint centers (N is an integer of 2 to 65), an aperture width of the parallax barrier may be 1.6 to (2N-1) times a pixel width.

When the parallax separation means is the line light source and N-1 viewpoint centers are spaced a certain distance between two binocular viewpoint centers (N is an integer of 2 to 65), a width of the line light source may be 1.6 to (2N-1) times a pixel width.

When the parallax separation means is the lenticular lens, N-1 viewing point centers are spaced a certain distance between two binocular viewpoint centers (N is an integer of 2 to 65), and an original focal length fo of the lenticular lens is a distance between the lenticular lens and pixels of the image display panel, f/fo is 0.5 to 0.9 inclusive if a focal length f of the lenticular lens is less than the original focal length fo of the lenticular lens, and f/fo is 1.06 to 20.8 inclusive if the focal length f of the lenticular lens is greater than the original focal length fo of the lenticular lens.

The viewer position tracking system may be configured to track 3D coordinates of positions of both of the viewer's pupils by tracking the positions of the viewer's pupils or a position of the viewer's face. In the image display panel, the control unit may be configured to control viewpoint image information for each 3D pixel line using viewing-positional information obtained through the tracking of the viewer position tracking system.

The 3D pixel line may be formed by an aperture of the parallax barrier, the lenticular lens, or the line light source, and pixels on the image display panel for providing viewpoint images.

Crosstalk may be minimized by providing the viewpoint images corresponding to both of the viewer's eyes at viewpoints corresponding to viewing-zone centers closest to the centers of both of the viewer's eyes and removing the viewpoint image other than those of the selected viewpoints using 3D information about positions of the viewer's pupils, the 3D information being obtained through the real-time tracking of the viewer position tracking system. The providing of the viewpoint images corresponding to both of the viewer's eyes and the removing of the viewpoint image other than those of the selected viewpoints may be determined for each 3D pixel line to minimize crosstalk The viewer position tracking system may track positions of a plurality of viewers and configured to track positions of each viewer's pupils and deliver information about the number of viewers and positions of the viewers' pupils to the control unit. Crosstalk may be minimized with respect to the plurality of viewers by providing the viewpoint images corresponding to both eyes of each of the viewers at viewpoints corresponding to viewing-zone centers closest to the centers of both of the eyes of each of the viewers and removing the viewpoint image other than those of the selected viewpoints using 3D information about the positions of the plurality of viewers' pupils, the 3D information being obtained through the real-time tracking of the viewer position tracking system. In this case, the providing of the viewpoint images corresponding to both eyes of each of the plurality of viewers and the removing of the viewpoint image other than the selected viewpoints may be determined for each 3D pixel line to minimize crosstalk with respect to the plurality of viewers.

The parallax barrier, lenticular lens, or line light source may be disposed to be inclined at a certain angle from a vertical line on a screen of the 3D image display device. The pixels of the image display device may be inclined in substantially the same angle as the inclination of the aperture of the corresponding parallax barrier, the line light source, or the lenticular lens. At least two edges of the pixels of the image display device are removed.

Advantageous Effects

According to embodiments of the present invention, it is possible to dynamically minimize crosstalk at a viewer's pupil even when the viewer moves in a 3D space including a viewpoint of each 3D pixel line, which is generated by a method of arranging the parallax barrier, the lenticular lens, and the line light source to form a viewing zone, and an optimal viewing distance (OVD) in the viewing zone, minimize change in brightness of the viewpoint image corresponding to the pupil, and provide a 3D image display device applicable to multiple viewers.

DESCRIPTION OF DRAWINGS

FIGS. 22A and 22B show a result obtained by calculating a range for an aperture design condition, a minimum aperture condition, and a maximum aperture condition in a parallax barrier when there are N-1 viewpoint centers spaced a certain distance between two viewpoints of both eyes according to an embodiment of the present invention.

FIG. 24 shows a result obtained by calculating a design condition range for a line light source, a minimum line light source width condition, and a maximum line light source width condition when there are N-1 viewpoint centers spaced a certain distance between two viewpoints of both eyes according to an embodiment of the present invention.

MODES OF THE INVENTION

Hereinafter, preferred embodiments of the present invention will be described in detail with reference to the accompanying drawings. However, the following embodiments are provided for those skilled in the art to fully understand the present invention and thus may be embodied in different forms. Accordingly, the present invention should not be construed as limited to the embodiments set forth herein.

A shape of a viewpoint generated by an autostereoscopic 3D image display device, an implementation method thereof, and a method of dynamically controlling a 3D image with movement of a viewer will be described below with reference to FIGS. 2 to 13.

The present embodiment describes a method of dynamically providing a 3D image only when a viewer does not significantly leave the designed optimal viewing distance. An image control method when the viewer significantly leaves the optimal viewing position will be described below in another embodiment.

Figure 1:
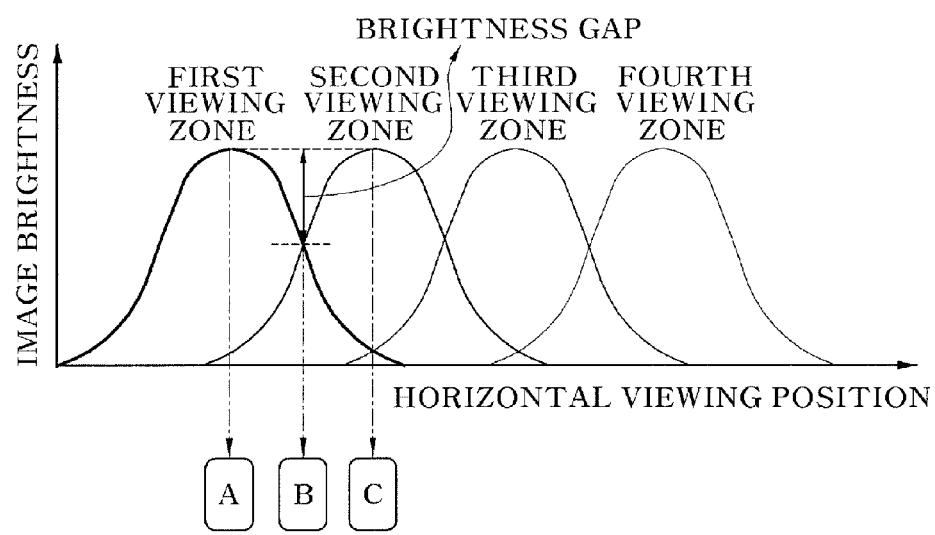
FIG. 1 is a conceptual diagram for describing a general viewing zone distribution at a position of a viewer of an autostereoscopic 3D image display device according to the related art.
Figure 2:
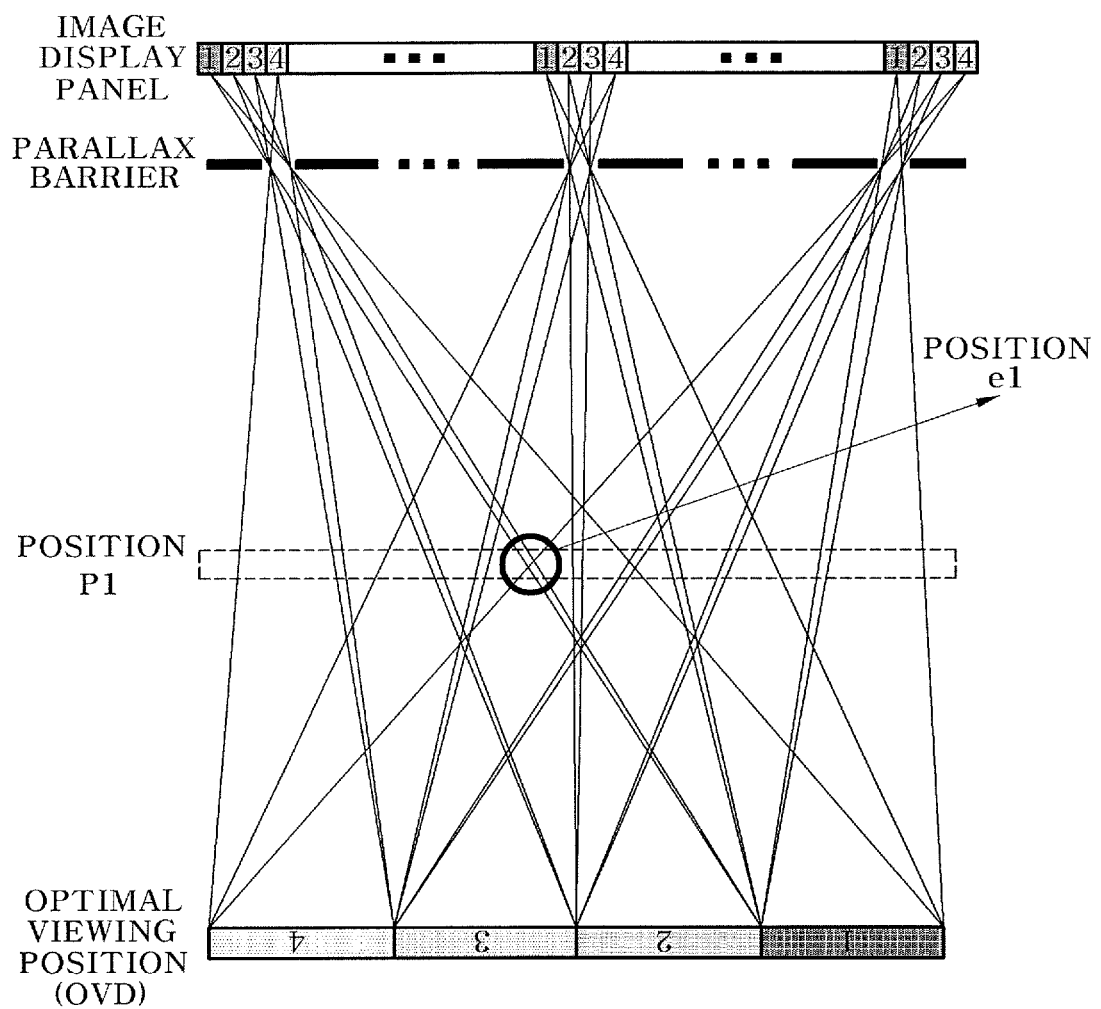
FIG. 2 is a conceptual diagram for describing a program occurring when a viewer moves in a depth direction of a 3D image display device using a parallax barrier according to the related art.
Figure 3:
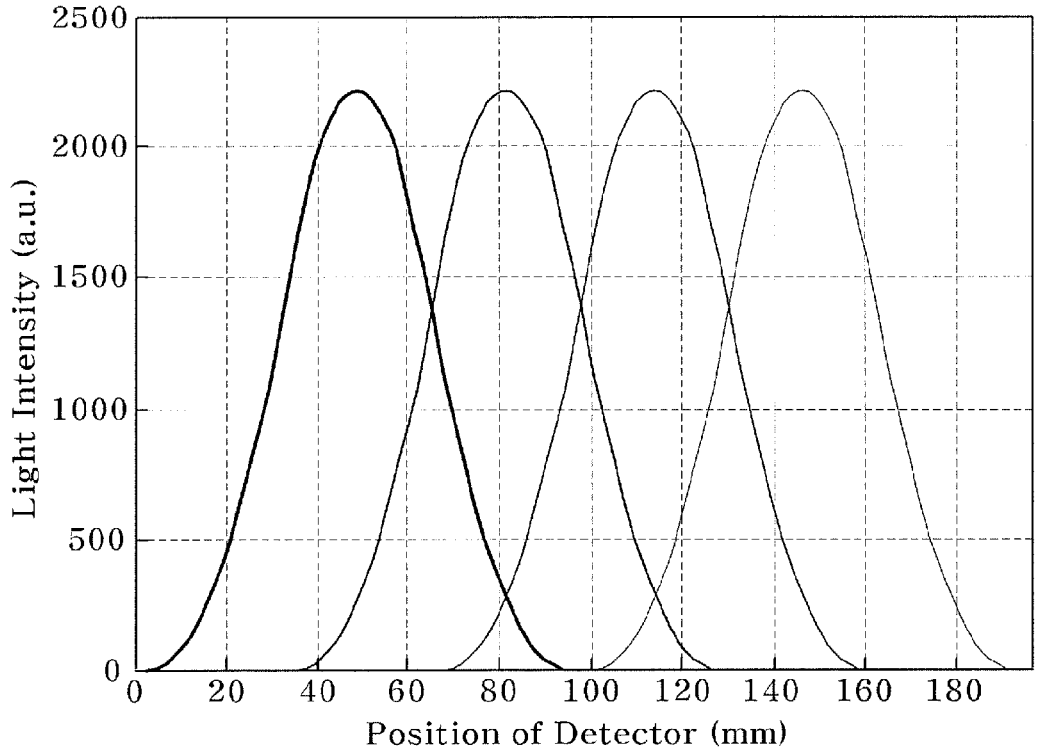
FIG. 3 shows a viewing zone distribution at an optimal viewing position in the 3D image display device using a parallax barrier according to the related art.

FIG. 2 shows four conventional methods of forming viewing points using a general parallax barrier. In this case, considering a viewing zone distribution (see FIG. 3) with a horizontal position at an optimal viewing distance (OVD) position, image brightness varies even when a viewer's pupil moves slightly from a center of a viewing zone.

Figure 9:
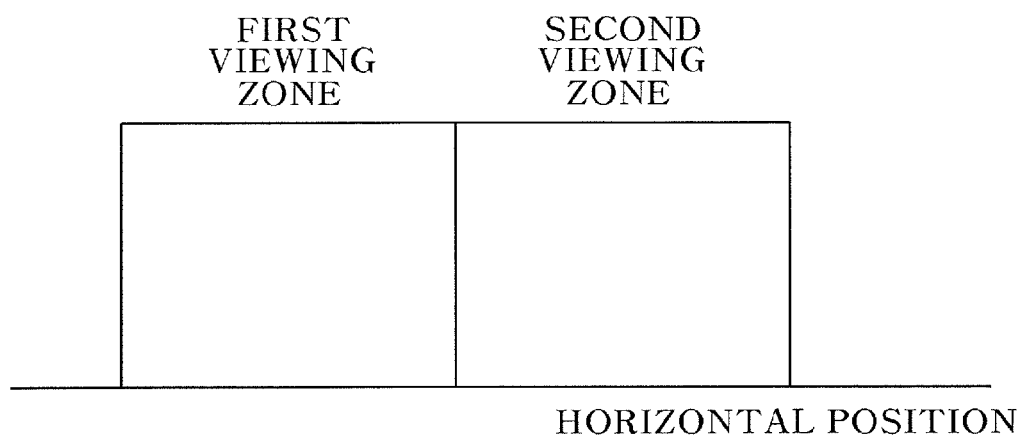
FIGS. 9 to 12 are conceptual views showing a brightness distribution and a disposition of viewing zones according to a preferred embodiment of the present invention.
Figure 10:
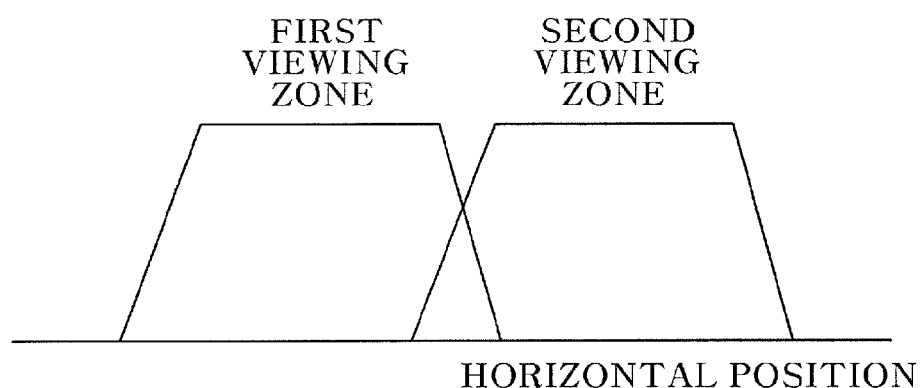

An ideal viewing zone brightness distribution to solve the above problems is shown in FIG. 9. When both of the viewer's pupils are positioned and move horizontally in a first viewing zone and a second viewing zone in a viewing zone brightness distribution shown in FIG. 9, a viewer may view a 3D image having uniform brightness with no change in viewpoint image brightness. However, in an ideal viewing zone brightness distribution, which may be implemented in practice, boundary parts of respective viewing zones are inclined and partially overlap. Even when a viewing zone brightness distribution is provided as shown in FIG. 10, there is no problem when the viewer's pupil moves horizontally within a unit viewing zone. However, when the viewer's pupil moves beyond a boundary of the viewing zone toward another viewing zone, the viewer experiences crosstalk in the boundary area between the viewing zones.

Figure 11:
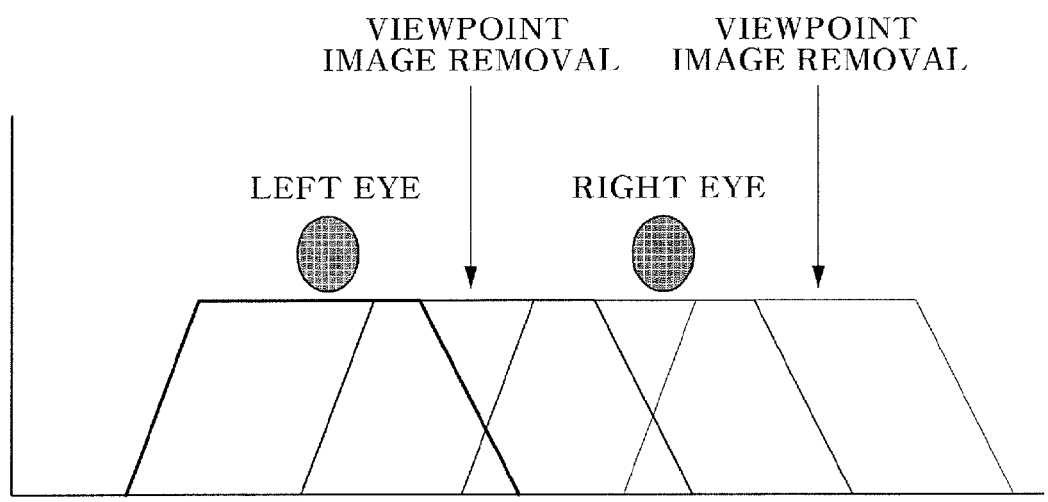

A preferred method to solve the above problem is to form one or more viewpoints between the viewpoints corresponding to both of the viewer's eyes as shown in FIG. 11 and forms viewing zones of the viewpoints corresponding to both of the eyes and viewing zones of the viewpoints between the eyes to partially overlap. FIG. 11 illustrates a case in which four viewpoints are designed, one viewpoint is additionally included between the eyes, and a distance between viewpoints is half of a distance between the pupils. When a left pupil and a right pupil are positioned at the first viewing zone and the third viewing zone, a control unit (see 120 of FIG. 13) receives pupil coordinates of both of the viewer's eyes, which are tracked in a pupil position tracking system (see 110 of FIG. 13), and causes an image display panel (see 130 of FIG. 13) to display image information for each viewpoint of an image display panel. As illustrated in FIG. 11, if a left-eye image and a right-eye image are provided in the first viewing zone and the third viewing zone, and image information about the second viewing zone and the fourth viewing zone is removed therefrom, the viewer can see a clear 3D image having no crosstalk at a current position. In this case, the viewer can see a uniform 3D image having no change in brightness of the image information even when the viewer moves to the right within one viewing zone. When the viewer moves further to the right such that the left pupil of the viewer is positioned at a position that is closer to the center of the second viewing zone than to the center of the first viewing zone, if control is performed to remove image information about the first viewing zone and the third viewing zone and provide the left-eye image and right-eye image to the second viewing zone and the fourth viewing zone, it is possible to continuously provide a clear 3D image with no change in image brightness or occurrence of crosstalk between viewpoints.

Figure 12:
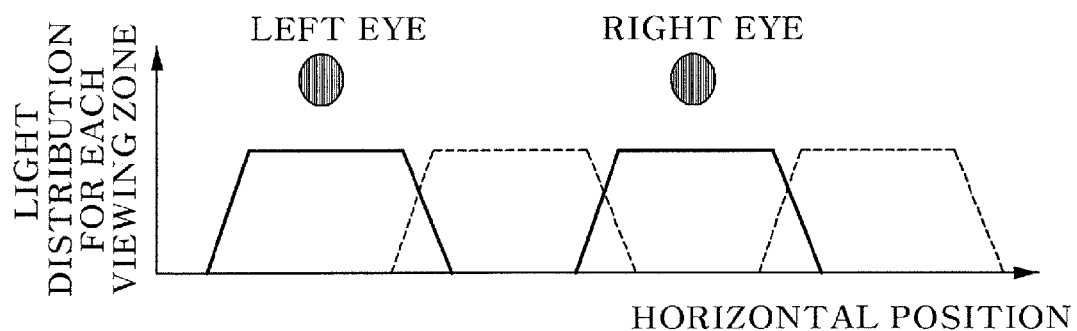

FIG. 11 shows that an overlapping part between adjacent viewing zones is disposed in a uniform area. An influence of the change in brightness of a viewing zone on a viewer is associated with sensitivity of visibility. Even when the overlapping part between adjacent viewing zones is not disposed in a uniform area but is disposed in a position having 85% or more of a maximum brightness of the viewing zone, as shown in FIG. 12, the viewer can view the 3D image while moving without feeling any great change in viewpoint image brightness. Further, FIGS. 10 to 12 show a case in which a middle area of a viewing zone is completely flat. However, for a shape of a viewing zone generated using an inclined parallax barrier, the middle area of the viewing zone may not be flat. In this case, the overlap between adjacent viewing zones is set to 85% or more of the maximum brightness of the viewing zone, thereby reducing the change in image brightness to 15% or less when the viewer moves.

As described above, it is possible to enlarge the uniform area of viewing zone, dispose one or more intermediate viewpoints between binocular viewpoints, and determine positions of both of the viewer's pupils to remove image information other than a viewpoint providing image information, thereby minimizing lack of uniformity of image brightness and occurrence of crosstalk, which are problems of conventional autostereoscopic 3D image display devices.

Furthermore, in viewpoints corresponding to both eyes, an image of a viewing zone of a viewpoint corresponding to one eye may be positioned at a center of a viewing zone of a viewpoint corresponding to the other eye to a degree of 5% or less of a maximum brightness, thereby minimizing crosstalk. Even considering pupil tracking precision, it is further preferred not to dispose images of other viewing points within a section in which a pupil may be positioned in the viewing zone.

Autostereoscopic type methods of forming a viewpoint at a position of a viewer include a method using an optical plate, such as a parallax barrier or lenticular lens, and a method using a line light source. Hereinafter, design conditions used to form the above viewpoint using a parallax barrier method, a line light source method, and a lenticular method are sequentially described.

In three types of viewing-zone forming technology, conditions of viewing-zone characteristics intended by the present invention based on a simulation result are calculated under the following common conditions.

Figure 14:
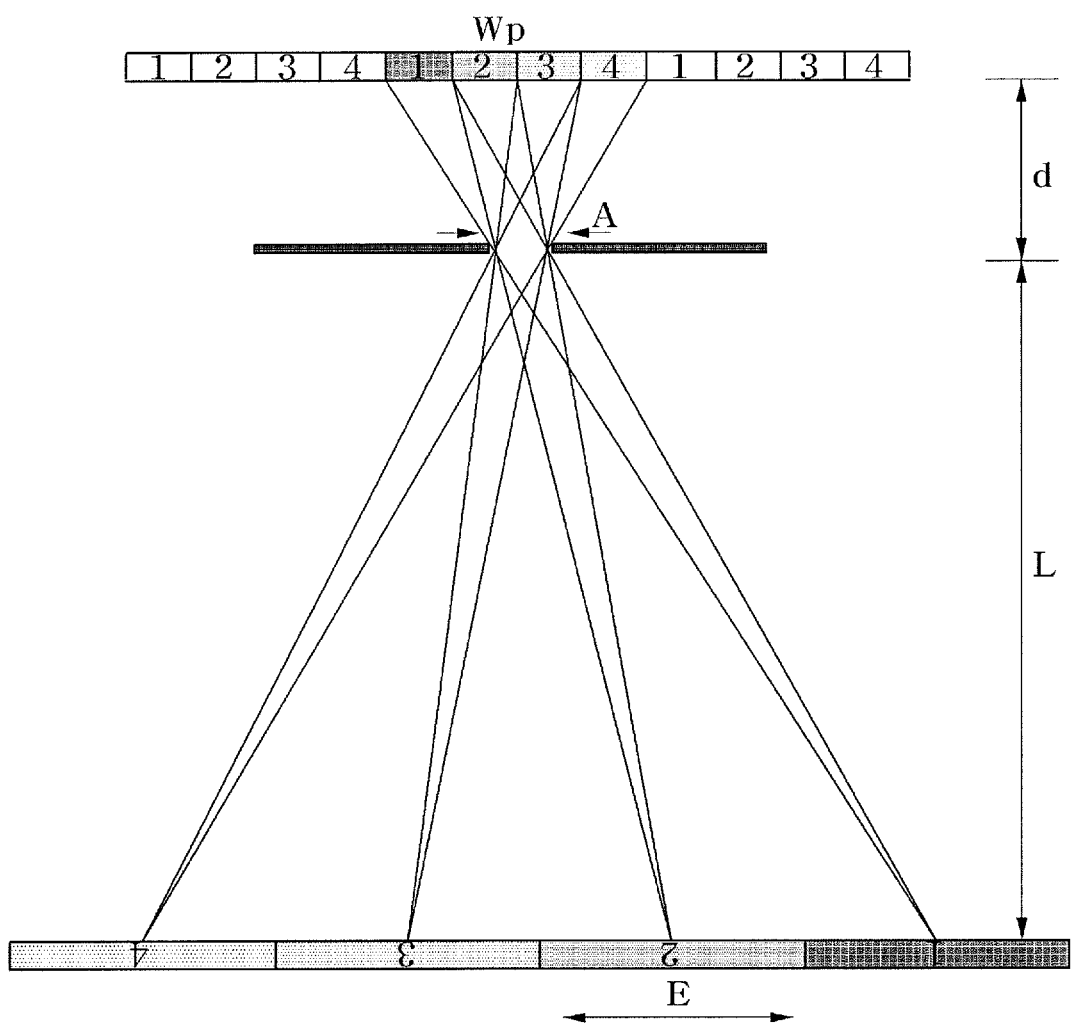
FIG. 14 is a conceptual diagram for describing a general aperture design condition in a parallax barrier type 3D image display device.
Figure 15:
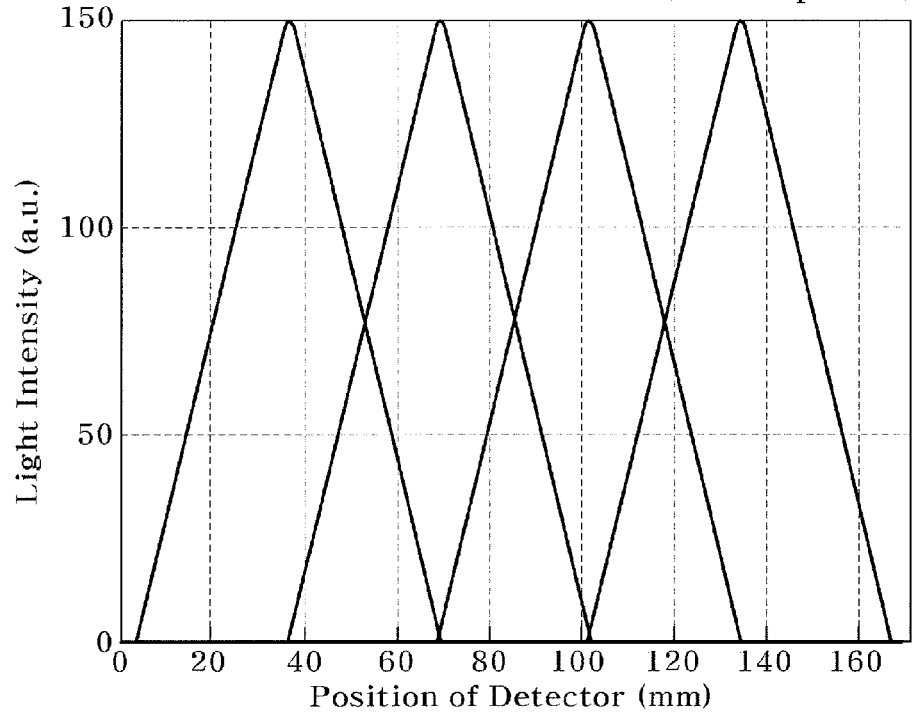
FIGS. 15 and 16 show a viewing-zone characteristic simulation result obtained in a general parallax barrier aperture condition of FIG. 14.
Figure 16:
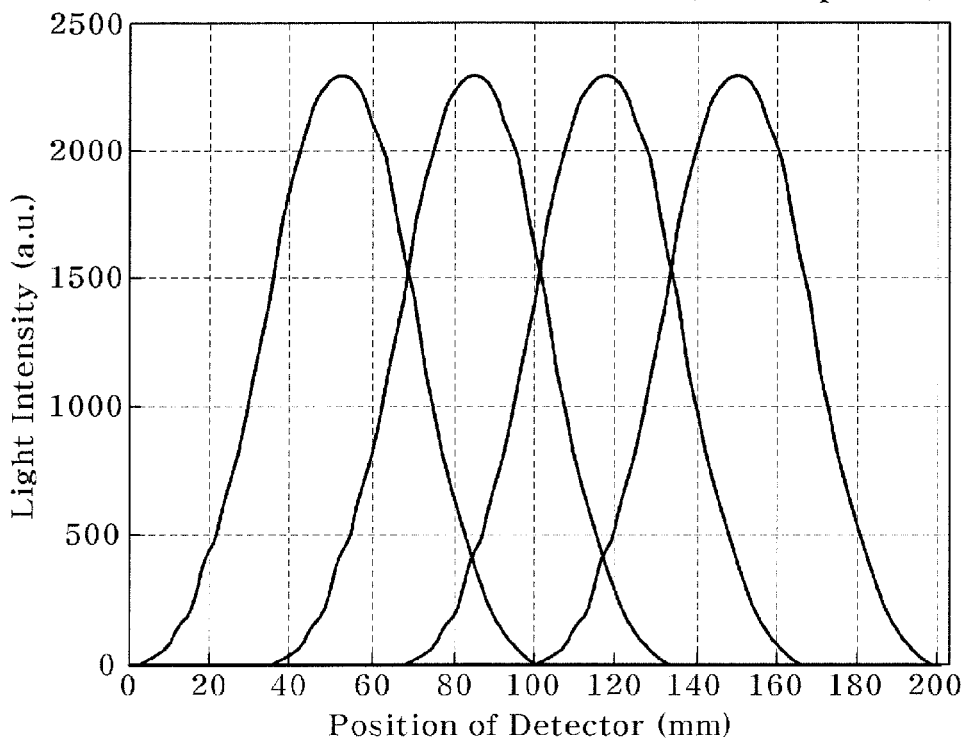

Unit pixel width=0.1 mm
Optimal viewing depth (OVD)=1000 mm
Binocular distance=65 mm
Number of viewpoints when N-1 viewpoint centers are spaced a certain distance between two binocular viewpoint centers, N=2, 3, 4, 5, 6, 7, and 10
Minimum number of viewpoints for one person according to N, 2×N=4, 6, 8, 10, 12, 14, and 20
(All simulation results are results at the OVD.)
(1) Parallax Barrier Method FIG. 14 is a conceptual diagram for describing a general aperture design condition in a multi-viewpoint parallax barrier type 3D image display device. In general, if a horizontal width A of individual apertures is applied similarly to a unit pixel width when designing the parallax barrier, a viewing zone distribution is formed as shown in FIG. 15 with respect to a vertical aperture and a viewing zone distribution is formed as shown in FIG. 16 with respect to an inclined aperture. A shape of the unit viewing zone is changed when a horizontal width of the aperture is changed. Here, viewing zone designs of FIGS. 15 and 16 are for four viewpoints. When the viewing characteristic for each viewpoint is the same as those shown in FIGS. 15 and 16, if both of the viewer's pupils are positioned at the center (that is, a brightest part of a viewpoint formed by each viewpoint) and move slightly in the horizontal direction, the image brightness of the corresponding viewpoint may be significantly changed, thereby preventing the viewer from viewing a 3D image having uniform brightness.

Also, under general design conditions as shown in FIGS. 15 and 16, the viewing zone having a shape similar to that shown in FIGS. 11 and 12 may be obtained by increasing a horizontal width of an aperture in FIG. 14. In a situation considering both a positive viewpoint and a negative viewpoint when contemplating shapes of the viewing zones, a horizontal width condition of the aperture always has at least one additional viewpoint, irrespectively of an order between a left-eye viewpoint and a right-eye viewpoint. In addition, the overlap between viewing zones of adjacent viewpoints occurs by at least 85% or more, such that a minimum aperture width condition $A_{min}$ is set to minimize a change in brightness while moving. At the same time, in viewpoints corresponding to both eyes, a maximum aperture width condition $A_{max}$ for determining a maximum limitation for allowing crosstalk is set by disposing an image of a viewing zone of a viewpoint corresponding to one eye at a center of a viewing zone of a viewpoint corresponding to the other eye by 5% or less of a maximum brightness.

The conventional problem may be solved with the 3D image display panel using a parallax barrier formed in the above condition. That is, a possible condition of a preferred aperture width A in the parallax barrier is $A_{min} \leq A \leq A_{max}$, and an optimal condition is around $A_{average} = (A_{min} + A_{max})/2$.

Figure 17:
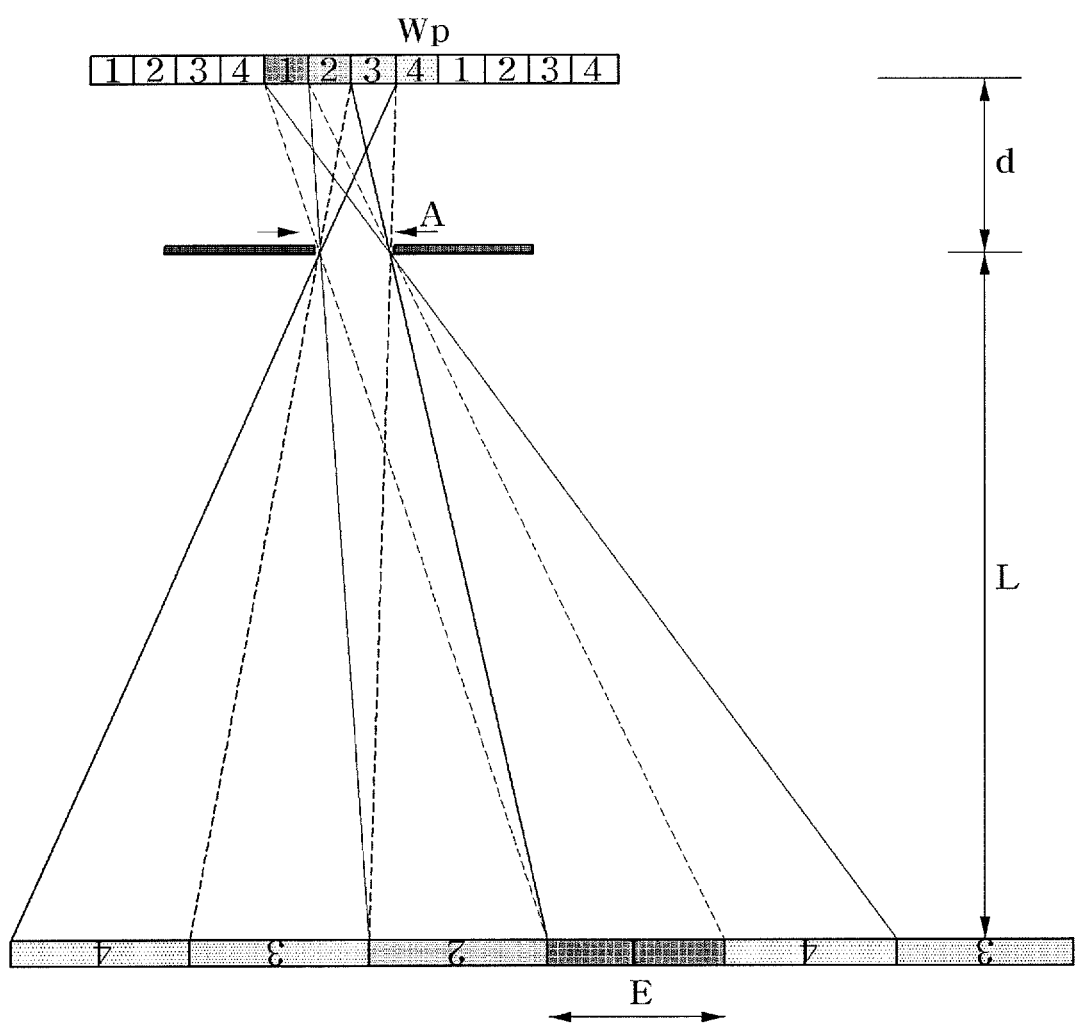
FIG. 17 is a conceptual diagram for describing a four-viewpoint parallax barrier aperture design condition according to an embodiment of the present invention.

FIG. 17 is a conceptual diagram for describing a method for designing an aperture of a parallax barrier when there is only one viewpoint between binocular viewpoints and a brightness distribution of the viewing zones formed thus according to an embodiment of the present invention in order to overcome limitations of conventional 3D image display devices using the parallax barrier. In this example, the aperture width is set to be twice the unit pixel width. A principle of the present invention will be described based on an aperture of a parallax barrier formed in a vertical direction and described as an example of four viewpoints that are a minimum number of viewpoints that are applicable to a concept of the present invention.

Figure 18:
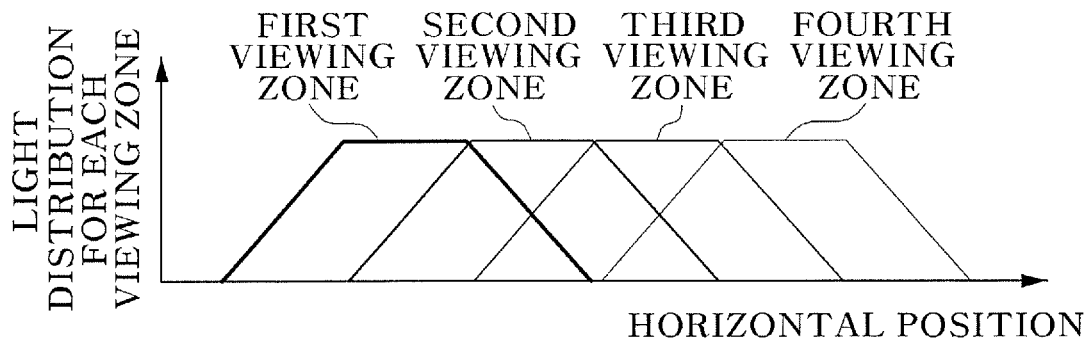
FIGS. 18 to 20 are conceptual diagrams for describing a shape of a viewing zone in an image display device having a parallax barrier aperture of FIG. 17 and a method of controlling a viewpoint image when a viewer moves.

A shape at an optimal viewing position (that is, a position at a distance L from a parallax barrier of FIG. 17) of the viewing zone of each of four viewpoints formed by designing an aperture of a parallax barrier shown in FIG. 17 is the same as shown in FIG. 18 when the aperture is an aperture of a parallax barrier vertical to the image display panel. In this case, a space E between viewpoints is set to be half of a space between the viewer's pupils (65 mm on average), and there is one intermediate viewpoint. In FIG. 18, negative viewing zones are omitted for simplification of description, but there may be negative viewing zones at the left of the first viewing zone and the right of the fourth viewing zone.

Figure 19:
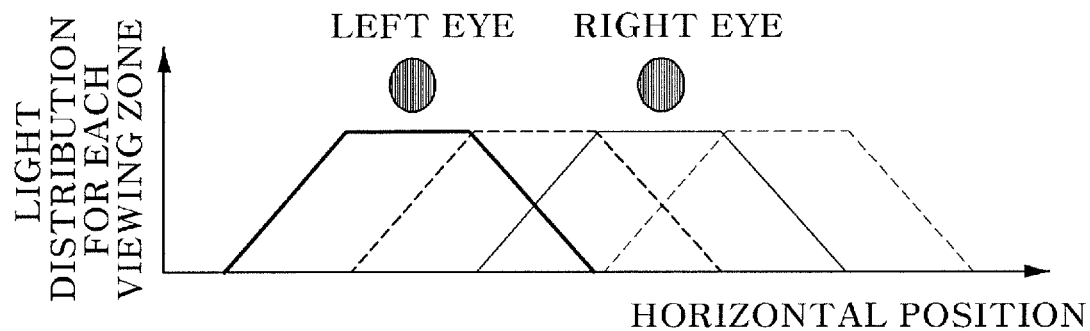
Figure 20:
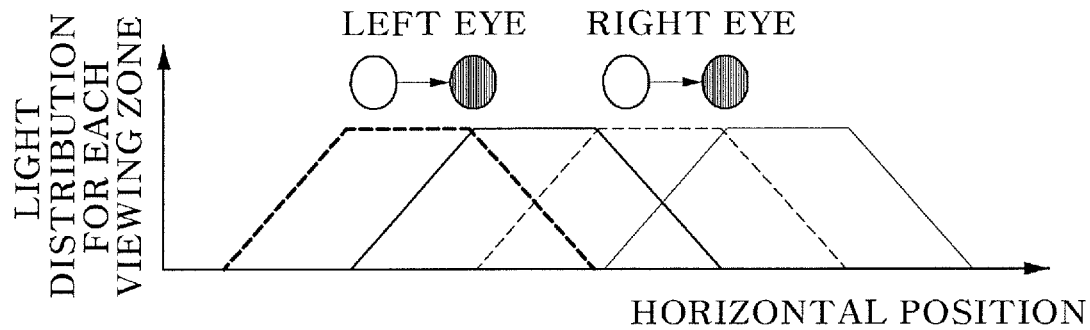

As shown in FIG. 19, when the viewer's left pupil is positioned at a central area of the first viewing zone, the viewer's right pupil of the viewer is positioned at a central area of the third viewing zone. In this case, if a left-eye image and a right-eye image are provided at the first viewpoint pixels and the third viewpoint pixels on the image display panel, and images of the second viewpoint pixels and the fourth viewpoint pixels are removed, the viewer views disparity images of the first viewing zone and the third viewing zone, which are obviously separated. As shown in FIG. 20, when a viewer moves to the right such that his or her left eye moves from a position represented in a dotted line to a position of an intersection point between the first viewing zone and the second viewing zone, the control unit changes information about pixels on the image display panel using information fed back from the pupil tracking system. That is, if the control unit performs control to provide a left-eye image and a right-eye image at the second viewpoint pixels and the third viewpoint pixels, respectively, and remove images of the first viewpoint pixels and the third viewpoint pixels, the viewer is able to view disparity images of the second viewing zone and the fourth viewing zone.

In the design of the viewing zone, it can be seen with reference to FIGS. 19 and 20 that a horizontal position at which brightness of a viewing zone begins to significantly change is a horizontal position at which crosstalk begins to occur. In addition, an aperture width somewhat greater than the aperture width shown in FIG. 17 results in slight overlap between neighboring viewing zones as shown in FIG. 11. Thus it is also possible to have no change in brightness when moving to a neighboring viewpoint even when considering an error in precision of pupil tracking.

As a result, when both of the viewer's pupils are positioned at the center of viewing zones and the viewer moves horizontally, the disparity images are provided at the viewing zones of the adjacent viewpoints and the previous viewpoint images are removed, thereby significantly improving the great change in image brightness when the viewer views a 3D image while moving and crosstalk generated by partially overlapping binocular viewpoint images.

Figure 21:
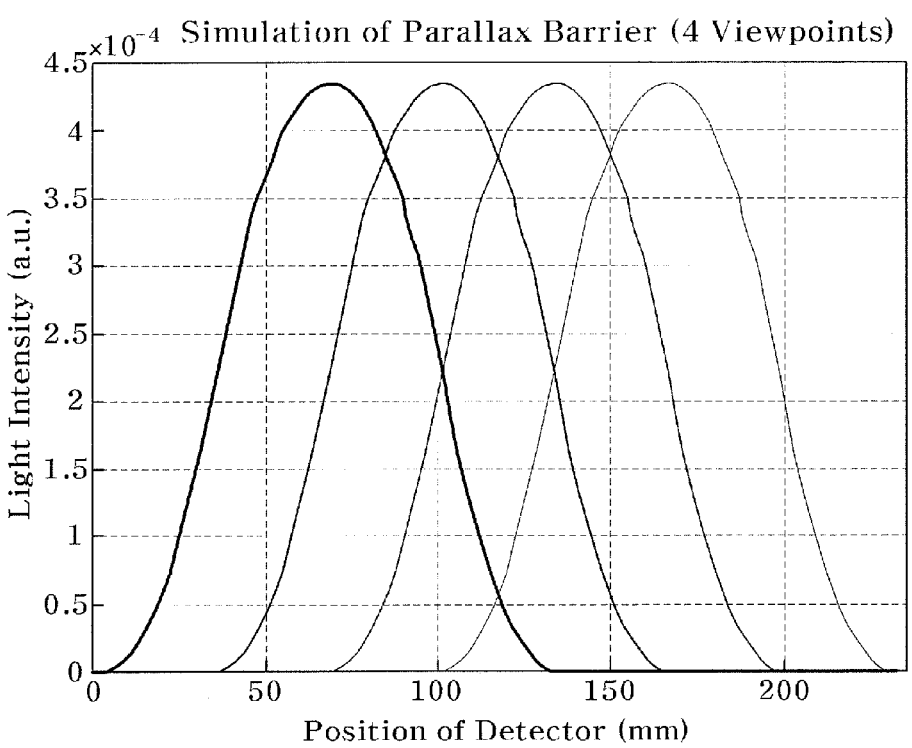
FIG. 21 shows a viewing-zone characteristic simulation result at an inclined parallax barrier according to an embodiment of the present invention.

However, a condition in which the size of the aperture is twice that of the pixel in the four-viewpoint design is preferably applied when the aperture of the parallax barrier is arranged vertically with respect to the image display panel and the space between the viewer's pupils is equal to a value of an average viewer (typically, 65 mm). However, when the aperture of the parallax barrier is inclined with respect to the image display panel, a brightness distribution of each viewing zone does not have an ideal trapezoidal shape as shown in FIG. 21. FIG. 21 illustrates a simulation result of the viewing zone distribution under the same condition as shown in FIG. 17, except that the aperture of the parallax barrier is inclined at an angle of $\tan-1(\frac{1}{3})$ to 18.43 degrees with respect to the image display panel, according to another embodiment of the present invention. The shape of the viewing zone formed in FIG. 21 does not show a uniform area in the middle of the viewing zone, unlike FIG. 18.

In FIG. 17, pixels of the image display panel are arranged on one plane for the sake of convenience. However, pixels having different vertical positions (y-direction positions) may be arranged (in particular, in a case in which the aperture of the parallax barrier is disposed to be inclined with respect to the image display panel).

When there are N-1 viewpoint centers spaced a certain distance between viewpoint centers of the eyes, a generalization condition for the size of the aperture of the parallax barrier relative to a pixel width may be found through simulation, using $A_{min} \leq A \leq A_{max}$, which is a condition of the preferred aperture width A. If a general binocular space is 65 mm, a space between neighboring viewpoints is 65 mm/N.

When a number of viewpoints are positioned between binocular viewpoints, it is advantageously possible to minimize crosstalk between binocular viewpoints and more naturally represent motion parallax. However, when the number of viewpoints between binocular viewpoints is greater, the resolution is decreased in proportion thereto. Therefore, it is necessary to set an appropriate value of N in consideration of the maximum number of viewers according to an application of a 3D display.

In addition, if there are N-1 viewpoint centers spaced a certain distance between two binocular viewpoints and the total number of viewpoints is M, M is at least equal to or greater than 2N in order to select the viewpoint images closest to the left eye and the right eye while the viewer moves. That is, since there is one viewpoint center between binocular viewpoints of the viewer as shown in FIG. 17, M should be at least equal to or greater than 4 when N is designed to be equal to 2. When there are three viewpoint centers between binocular viewpoints, M should be at least equal to or greater than 8 because N=4.

FIGS. 22A and 22B show a result of simulating a range of the aperture of the parallax barrier based on the total number of viewpoints according to a preferred embodiment of the present invention as described above. FIGS. 22A and 22B are results for a range of an aperture of a vertical parallax barrier and a range of an aperture of an inclined parallax barrier. In the above two cases, ½ of the entire viewpoint is set as a space between binocular viewpoints.

First, for the vertical parallax barrier, it can be seen that the minimum aperture condition is 1.6 times the pixel width with respect to the total number of viewpoints. However, it can be seen that the maximum aperture condition is increased with increase in the total number of viewpoints. It can be seen that the maximum aperture condition according to the total number of viewpoints has a certain tendency. That is, if the total number of viewpoints is 2N (that is, there are N-1 viewpoint centers spaced a certain distance between two binocular viewpoints, it can be seen that the maximum aperture condition is approximately (2N-1)*Wp, which is (2N-1) times the pixel width Wp.

In this case, N is preferably an integer of 2 to 65. That is, there should be at least one viewpoint between binocular viewpoint centers (that is, when N=2), and the space between the binocular viewpoints should be significantly divided by at least 1 mm or more and an average binocular space is about 65 mm. Thus when N=65, N is the maximum value.

Second, for the inclined parallax barrier, it can be seen that the minimum aperture condition is 1.8 times the pixel width with respect to the total number of viewpoints. The maximum aperture condition has a similar tendency to the vertical parallax barrier. That is, a condition for the aperture of the inclined parallax barrier can be seen the same as the vertical parallax barrier, except that an aperture condition range for each number of viewpoints is slightly reduced. Accordingly, a method using a line light source or the lenticular lens according to another embodiment of the present invention will be described with only a vertical line light source and a vertical lenticular lens.

(2) Line Light Source Method.

Figure 23:
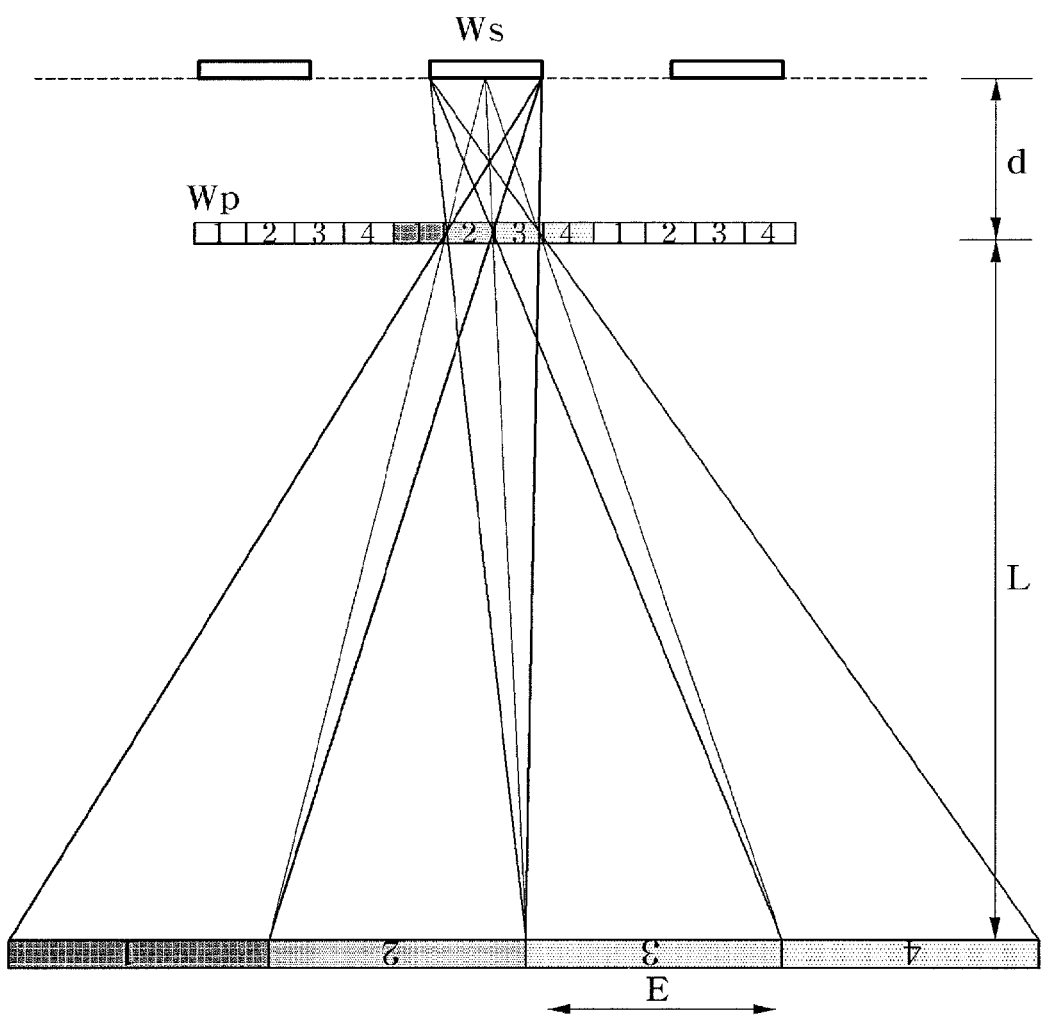
FIG. 23 is a conceptual diagram for describing a design condition of a four-viewpoint line light source according to an embodiment of the present invention.

FIG. 23 is a conceptual diagram for describing a line width of a line light source for forming uniform viewing zones at four viewpoints using a vertical line light source. This corresponds to FIG. 17, which is a diagram for finding a condition for a size of an aperture of a parallax barrier. As a result of simulation for inducing a similar result to the parallax barrier method of FIG. 17 in the method using the line light source, a width of the line light source should be approximately twice that of a unit pixel, similarly to that of the aperture of FIG. 17. Accordingly, if the width of the vertical line light source is set to be twice that of the unit pixel and then the simulation is performed, a result similar to that shown in FIG. 18 may be obtained.

FIG. 24 shows a result of simulating a range of a line light source for each entire viewpoint according to the total number of viewpoints according to a preferred embodiment of the present invention. In particular, the simulation result is obtained when there are N-1 viewpoint centers spaced a certain distance between the two binocular viewpoints. In FIG. 24, d denotes the distance between the line light source and the image display panel, and W(LS) denotes a separation distance between adjacent line light sources. As the total number of viewpoints increases, d and W(LS) tend to increase.

Referring to FIG. 24, even in all the case in which the total number of viewpoints are different, it can be seen that a minimum line light source width condition is 1.6 times the pixel width and a maximum line light source width condition increases with the increase in the total number of viewpoints. However, it can be seen that the maximum line light source width condition according to the total number of viewpoints has a certain tendency. That is, if the total number of viewpoints is 2N (that is, there are N-1 viewpoint centers spaced a certain distance between two binocular viewpoint centers), it can be seen that the maximum line light source condition is approximately (2N-1)*Wp, which is (2N-1) times the pixel width Wp. In this case, N is preferably an integer of 2 to 65.

(3) Lenticular Optical Plate Method

A method using a lenticular lens, which is an embodiment that can provide the shape and overlap of the viewing zone according to the present invention, will be described as follows.

An adjustment of a focal length of the lenticular lens corresponds to the adjustment of the aperture of the parallax barrier or the line width of the line light source. In general, when designing the viewing zone, an effective focal length (f) of the lenticular lens is set similar to a distance d between a pixel plane of the image display panel and a center plane of the lenticular lens. Here, d is calculated according to the determination of a distance between neighbor viewpoints in multi-viewpoints, that is, a unit viewpoint viewing zone width. Accordingly, if the unit viewing zone width is determined, then a value of d may be calculated and thus determined. In a certain range in which the focal distance f of the lenticular lens is greater or less than the distance d between the lenticular lens and the pixel plane of the image display device, the viewing zone having the trapezoidal shape may be formed, which is implemented by the parallax barrier and the line light source methods. That is, the overlap between the viewing zones of the adjacent viewpoint by 85% or more and the crosstalk of 5% or less in the center between the binocular viewpoints may be achieved.

Figures 25, 26:
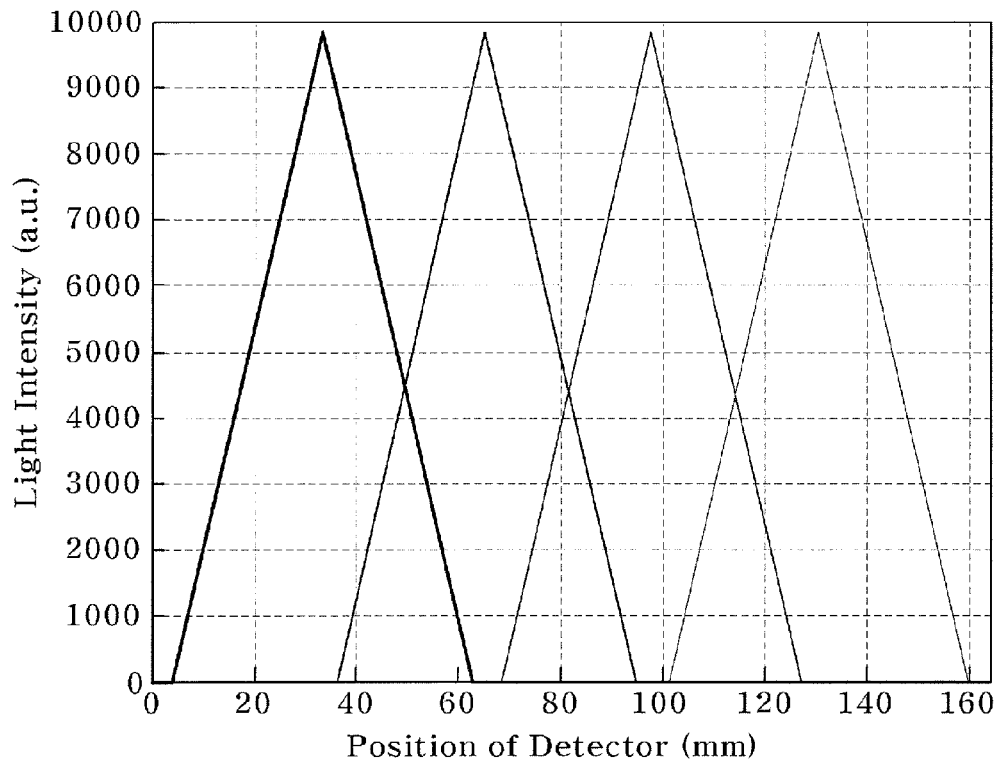
FIG. 25 shows a viewing-zone characteristic simulation result under general conditions in a lenticular lens type 3D image display device.
FIG. 26 shows a result obtained by calculating a design condition range for a lenticular lens, a condition for an area having a focal length less than a general lenticular separation distance, and a condition for an area having a larger focal length greater than the general lenticular separation distance when there are N-1 viewpoint centers spaced a certain distance between two viewpoints of both eyes according to an embodiment of the present invention.

When the lenticular lens is used as the parallax separation means, a viewing zone similar to that of the case using the parallax barrier is formed. For example, a viewing-zone characteristic for a case of four viewpoints is shown in FIG. 25. That is, FIG. 25 shows an OVD position viewing-zone characteristic in a situation in which a vertical lenticular optical plate is applied, when the focal distance (3.9 mm) of the lenticular lens, which is longer than the distance (3.0769 mm) between the center of the lenticular lens and the display plate by approximate 30%, is applied.

FIG. 26 shows a result of simulating the range of the focal length of the lenticular lens according to the total number of viewpoints according to an embodiment of the present invention. In particular, the simulation result is obtained when there are N-1 viewpoint centers disposed to be spaced a certain distance between the two binocular viewpoint centers (N is an integer of 2 to 65). In this case, f0 (hereinafter referred to as an original focal length) of FIG. 26 represents a case in which the focal length of the lenticular lens is d, that is, a case in which an adjustment is made to the pixel plane of the image display panel.

In FIG. 26, a first focal length range according to the total number of viewpoints represents a case in which the focal length is less than the original focal length fo. In this case, a minimum focal length relative to the original focal length f/fo(min) has a range of 0.5 to 0.55 with the increase in the total number of viewpoints. In addition, a maximum focal length relative to the original focal length f/fo(max) has a range of 0.72 to 0.92 and increases with the increase in the total number of viewpoints.

In FIG. 26, a second focal length range according to the total number of viewpoints represents a case in which the focal length is greater than the original focal length fo. In this case, a minimum focal length relative to the original focal length f/fo(min) has a range of 1.06 to 1.63 and decreases with the increase in the total number of viewpoints. In addition, a maximum focal length relative to the original focal length f/fo(max) has a range of 4.88 to 20.8 and increases with the increase in the total number of viewpoints.

An embodiment of the present invention will be described with reference to FIGS. 27 to 30 in relation to an aperture of a parallax barrier in a direction inclined with respect to the image display panel, the line optical source, or the pixel structure on the image display panel for improving the shape of the viewing zone in the lenticular lens on the basis of the parallax barrier.

Figure 27:
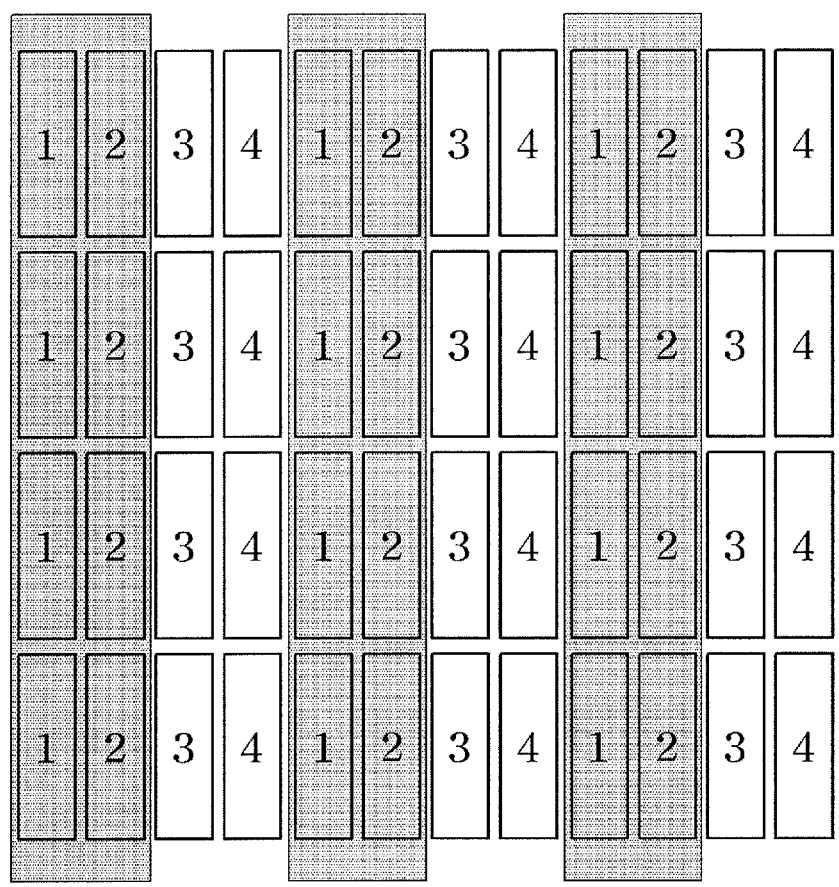
FIGS. 27 and 28 are conceptual diagrams for describing a vertically arranged parallax barrier and an inclined parallax barrier in comparison.
Figure 28:
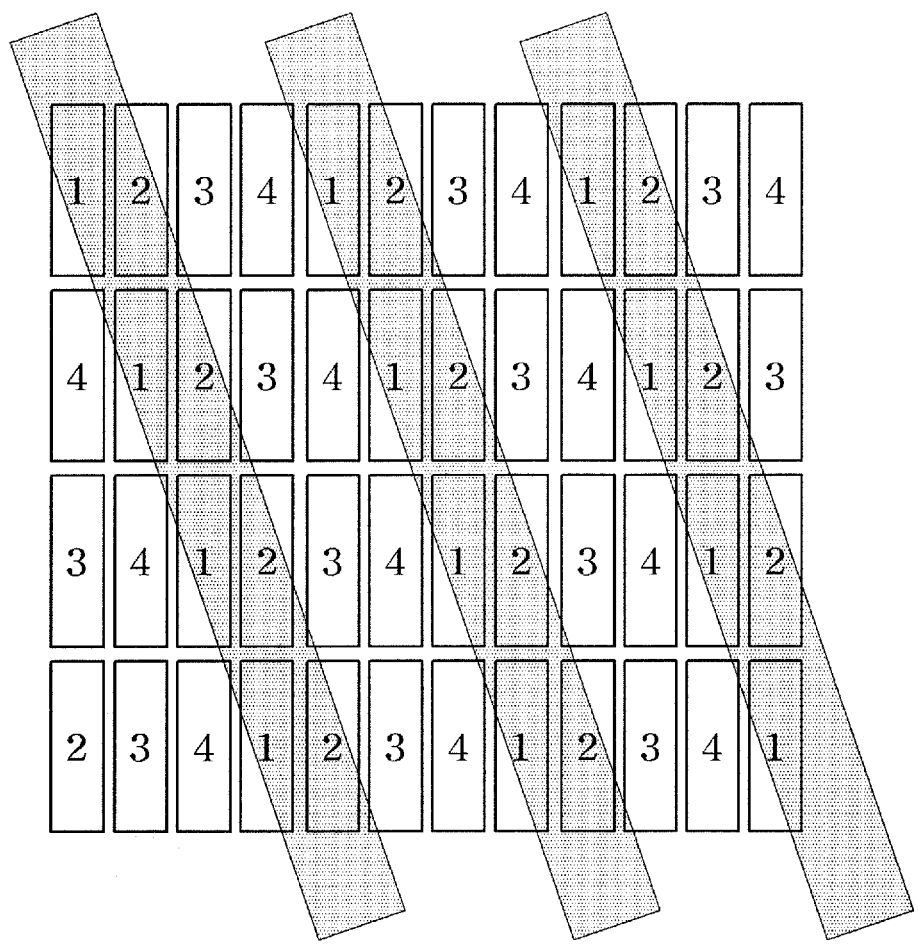

The general pixel structure of the image display panel is the same as that shown in FIG. 27. FIG. 27 shows viewpoint images for pixels when designed in four viewpoints. In this case, since the distance between the binocular viewpoints is 2 viewpoints, the aperture of the parallax barrier, which is a condition for flattening a viewpoint of the present invention, is two times the pixel width and is disposed vertically. The viewing-zone characteristic in such a disposition is the same as that shown in FIG. 18. However, a case in which the aperture of the parallax barrier is inclined from the vertical direction as shown in FIG. 28 has a difference in brightness between a central part of the viewpoint and a part overlapping the adjacent viewpoint, as shown in FIG. 21, even when the aperture condition in which the shape of the viewing zone is the same is applied.

Figure 29:
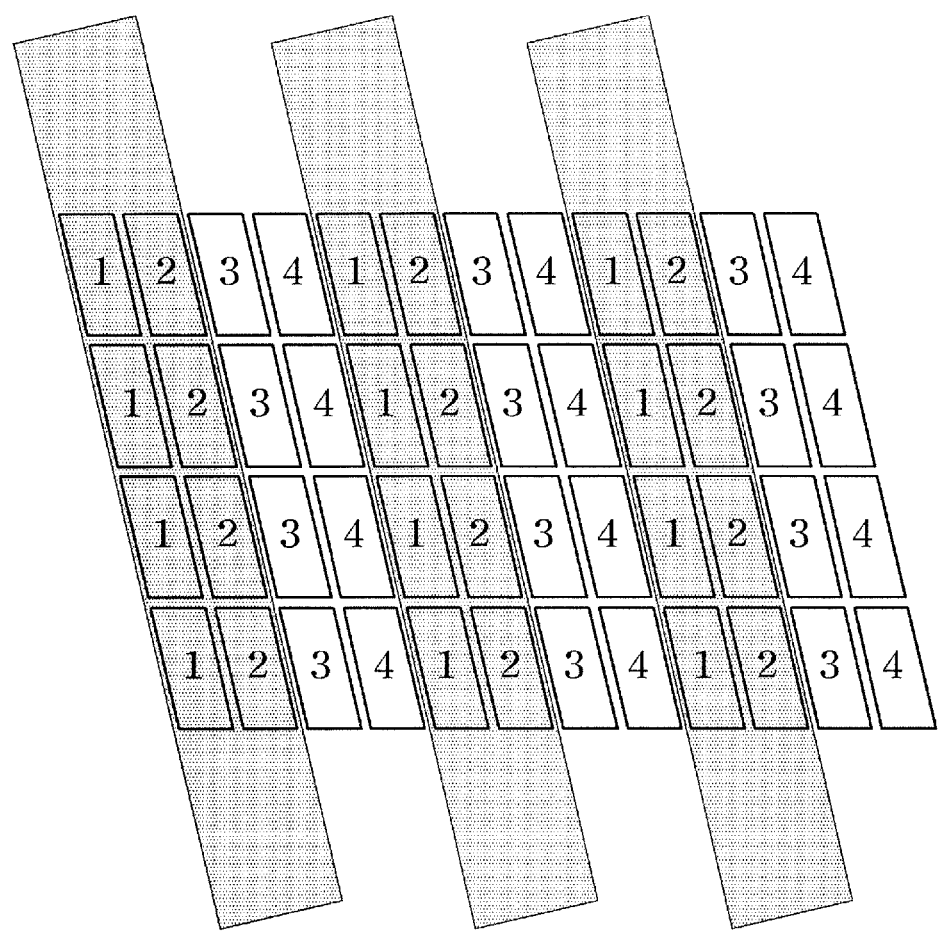
FIG. 29 is a conceptual diagram for describing a pixel structure inclined at the same angle as the inclined parallax barrier according to an embodiment of the present invention.

This is an effect of the aperture inclined with respect to the vertical pixel structure. The pixel structure for eliminating the effect is shown in FIG. 29. If an inclination direction of the aperture of the parallax barrier is arranged to be substantially the same as the inclination direction of the pixels, the ideal viewing zone may be made, as shown in FIG. 18, even by the aperture of the inclined parallax barrier. In addition, the pixels of the image display device are preferably inclined in substantially the same direction as the inclination of the corresponding line optical source or the lenticular lens.

Figure 30:
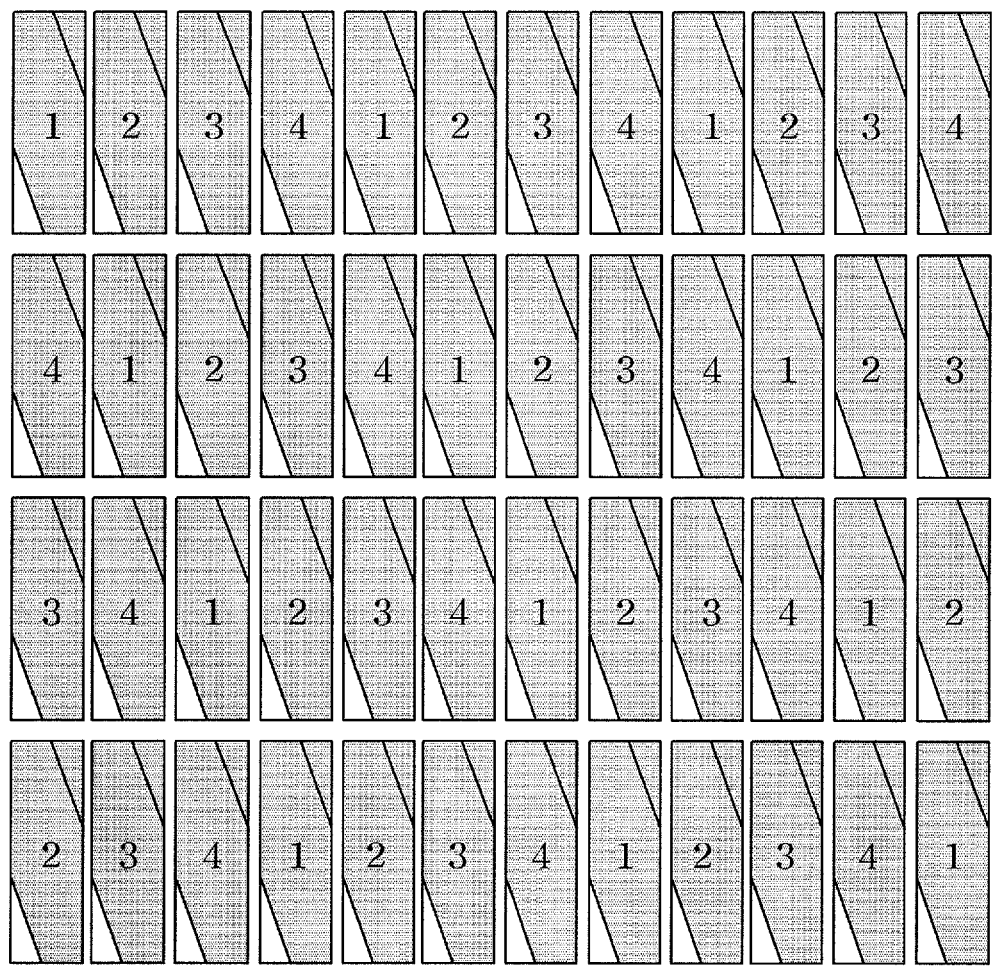
FIG. 30 is a conceptual diagram for describing a pixel structure having no pixel edge according to an embodiment of the present invention.

However, the pixel structure of FIG. 29 may be difficult to manufacture because the pixel structure on the image display panel needs to be significantly changed. In this case, the shape of the pixel area needs to be changed with respect to the same pixel structure as that shown in FIG. 30. That is, when the pixel structure is formed as shown in FIG. 30, the viewing zone may be flattened even in the aperture of the inclined parallax barrier. A black part within the pixel of FIG. 30 may be processed in a black matrix (BM) and designed as a region in which image information is not actually generated. The structure shown in FIG. 30 has an aperture ratio of the pixel less than the general pixel structure of FIG. 27, but has an advantage in that the flattened viewing-zone structure may be formed according to an embodiment of the present invention even when the aperture of the inclined parallax barrier is used when using the existing vertical pixel structure.

FIGS. 27 to 30 have been described as an example of when the number of viewpoints is 4 (that is, there are two viewpoints between binocular viewpoints). Of course, the present invention may be applied even to a case in which there are two viewpoints or more between the binocular viewpoints and a case in which the inclined light optical source is used or the inclined lenticular lens is used.

Figure 31:
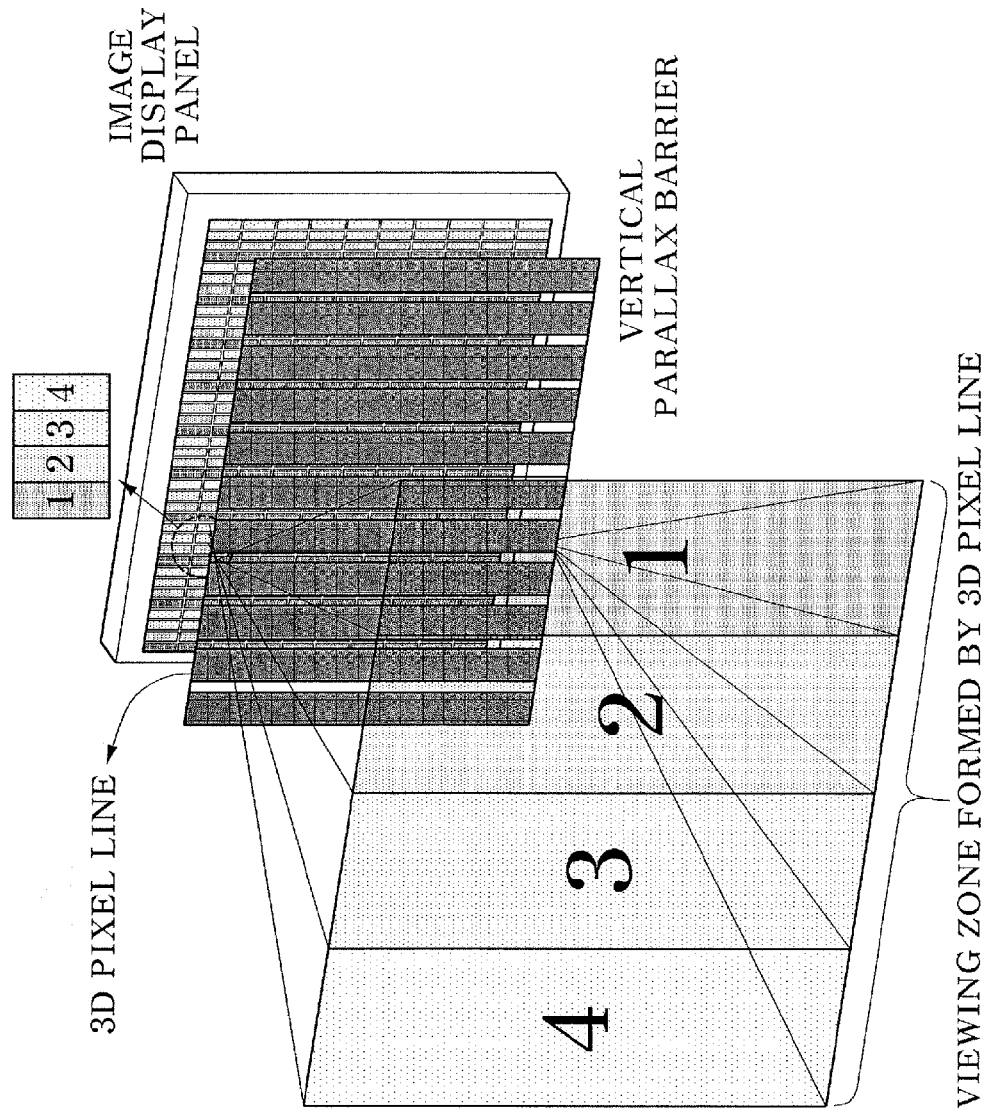
FIGS. 31 and 32 are conceptual diagrams for describing a vertical 3D pixel line and an inclined 3D pixel line.

A method for providing a clear 3D image without crosstalk, such as at the optimal viewing position, when moving a depth direction according to still another embodiment of the present invention will be described in detail below with reference to FIGS. 2 and 31. Although the shape and disposition of the viewing zone are formed at the optimal viewing position according to an embodiment of the present invention, the viewer cannot be provided with the clear 3D image because the formed shape and disposition of the viewing zone is changed when the viewer leaves the optimal viewing position (see FIGS. 4 and 5). The present invention introduces a concept of a 3D pixel line such that the viewer may be provided with the optimal 3D image while the viewer moves in the depth direction, and a method for viewing an optimal 3D image using the introduced concept of the 3D pixel line even while the viewer moves in the depth direction.

Figure 6:
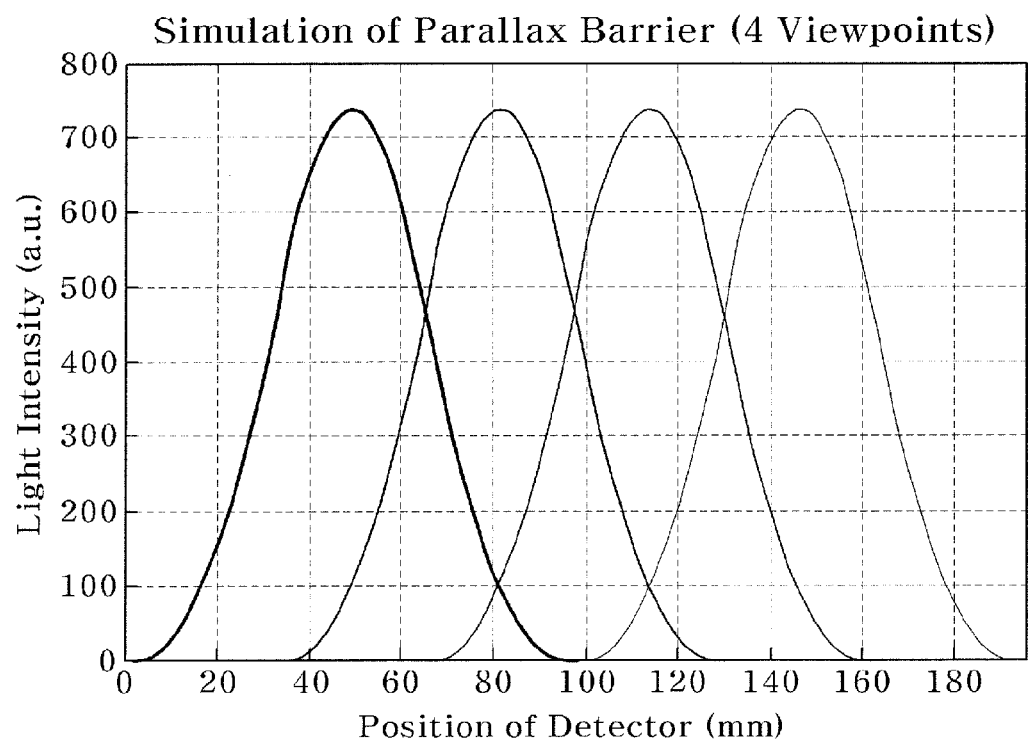
FIG. 6 shows a viewing zone distribution at the OVD for each 3D pixel line when the viewing zone is considered for each 3D pixel line.
Figure 7:
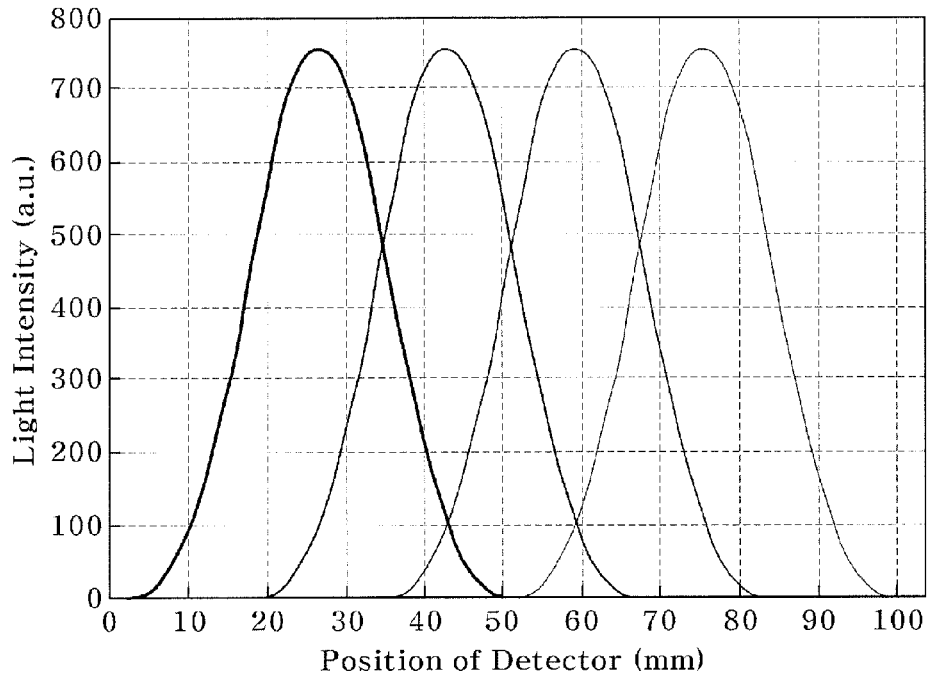
FIG. 7 shows a viewing zone distribution for each 3D pixel line when a viewer moves to P1 (½ of the OVD) in a depth direction.
Figure 8:
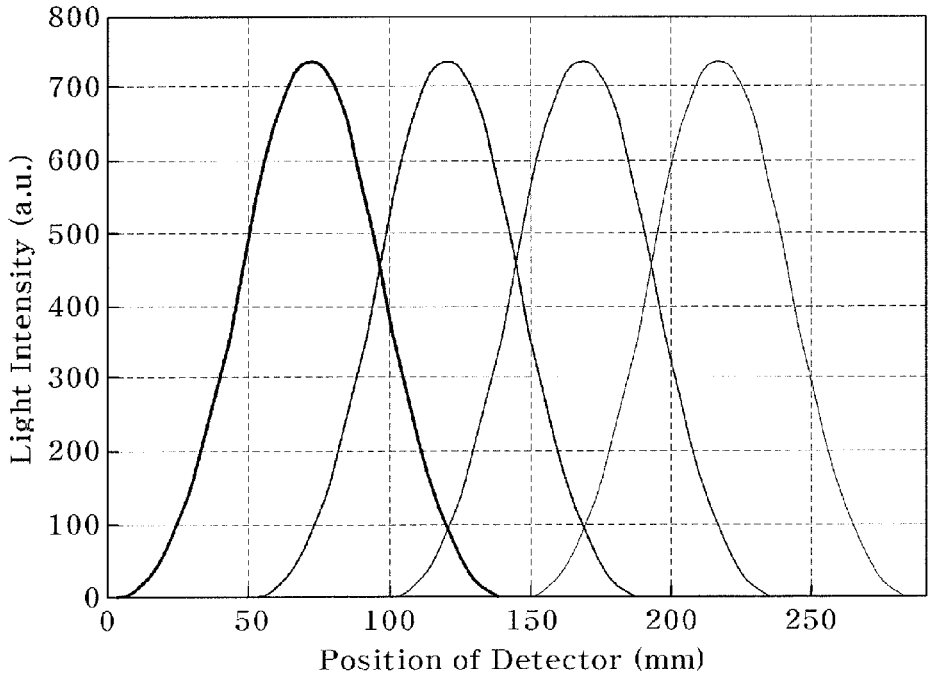
FIG. 8 shows a simulation result of a viewing zone distribution for each 3D pixel line when a viewer moves at a distance of 1.5 times the OVD in a direction away from the OVD
Figure 32:
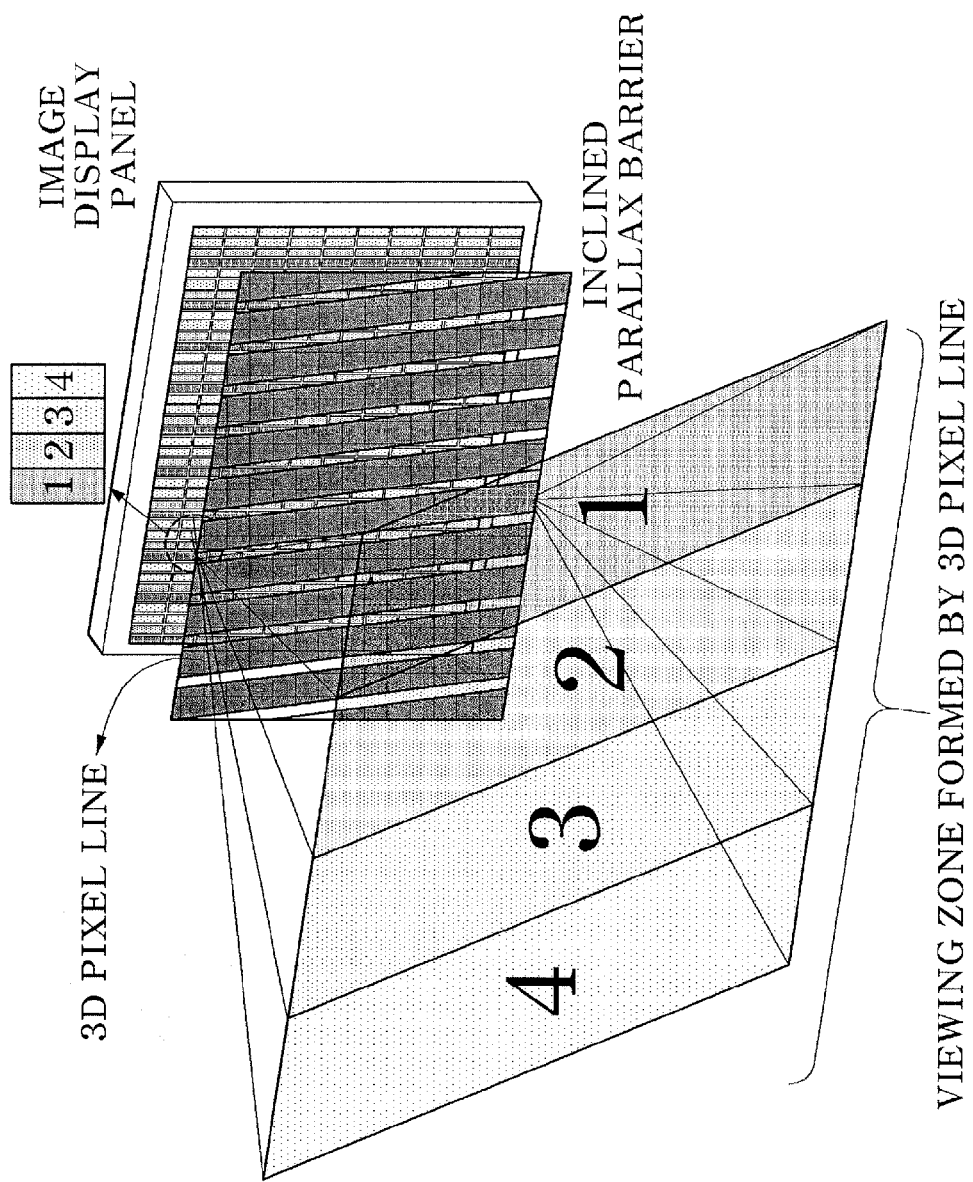

The 3D pixel line includes pixels on the image display panel for providing each aperture, each lenticular lens, or each line optical source, and each viewpoint image of the parallax barrier. FIG. 31 shows a case in which the 3D pixel line is vertically disposed when there are four viewpoints, and FIG. 32 shows a case in which the 3D pixel line is disposed to be inclined. In both cases, it can be checked that the viewing-zone distribution (FIG. 3) in the OVD of FIG. 2 may have the same shape, as shown in FIGS. 6, 7 and 8, in consideration of each 3D pixel line. Using this characteristic, the viewing-zone characteristic may be applied to any other depth in addition to the OVD using the viewing-zone distribution formation result of the OVD.

Figure 4:
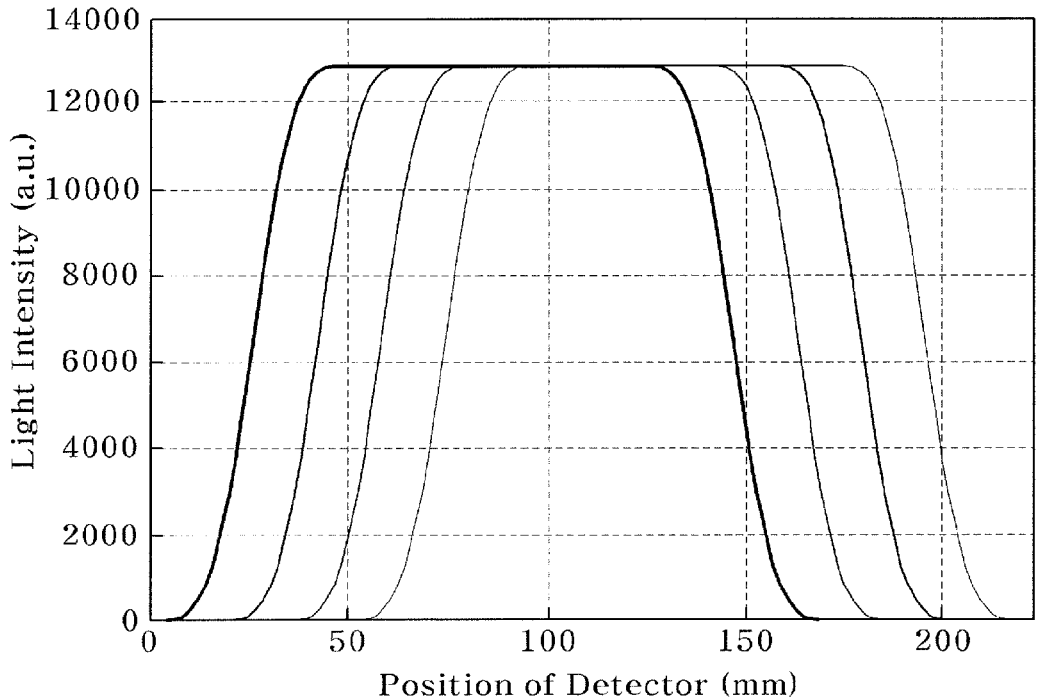
FIG. 4 shows increase in crosstalk due to inconsistency between viewing zones when a viewer moves toward the position P1 (a distance which is ½ of an OVD depth) in a depth direction.
Figure 5:
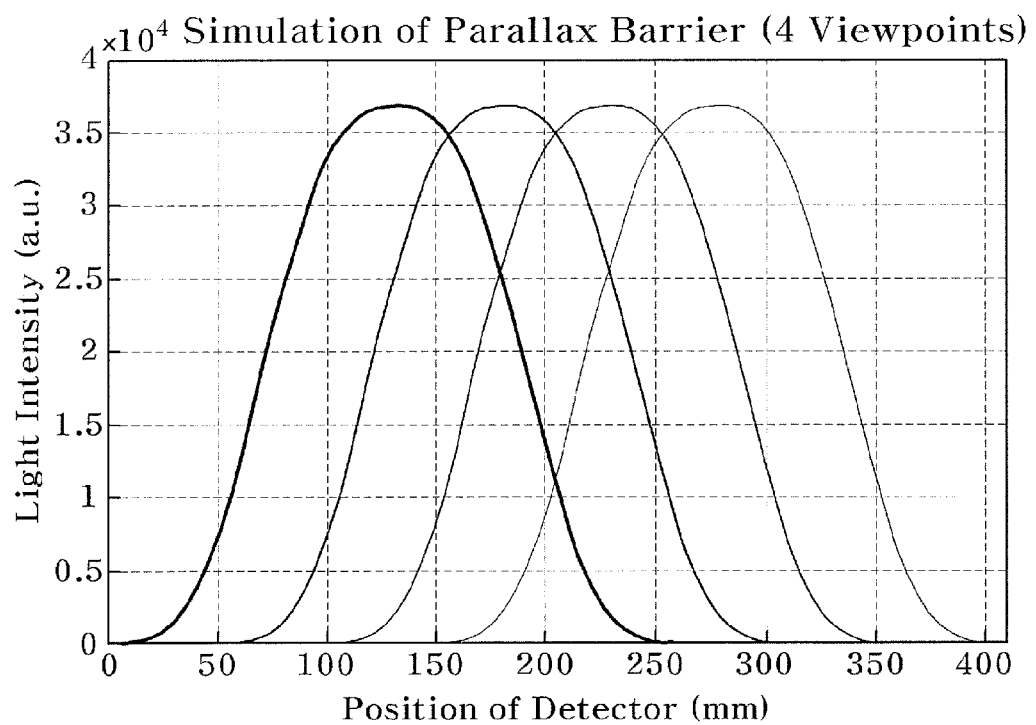
FIG. 5 shows increase in crosstalk generated at a distance of 1.5 times the OVD.

When the viewer leaves the OVD position in the depth direction to move to a position P1 (a distance of 0.5 times the OVD), the viewing zones of the right eye and the left eye are not separated well and overlap, unlike at the OVD, thereby preventing the viewer from viewing a clear 3D image (see FIG. 4 with respect to the viewing zone distribution at the position P1). In addition, although not shown in FIG. 2, even when the viewer moves to 1.5 times the OVD, the shape of the viewing zone is changed and thus the crosstalk is increased.

This will be described in more detail below with reference to FIG. 4. Considering the intersection of boundaries between viewing zones within a dotted line of a position P1 of FIG. 2, even when one pupil is positioned at the center of the viewing zone of any one pixel of the position P1, the other pupil may be positioned at a boundary between the viewing zones. In this case, as described above, the crosstalk is inevitably maximized for each aperture. Accordingly, the crosstalk is, on average, greater than that at the optimal viewing position. This situation occurs even when the distance is far from the optimal viewing position. Accordingly, if the viewer is significantly far from the optimal viewing position, a large amount of crosstalk inevitably occurs at all positions.

Accordingly, as shown in FIGS. 6, 7, and 8, considering one aperture line (one line light source, or one lenticular lens for the lenticular optical plate), that is, only one 3D pixel line for the parallax barrier, as in the optimal viewing position (FIG. 6), the brightness distribution of the viewing zone is hardly changed even when the position of the viewer is twice as far as the optimal viewing position (see FIG. 7) or 1.5 times as far as the optimal viewing position (see FIG. 8). Accordingly, by applying the above conditions induced at the optimal viewing position, that is, a condition that the adjacent viewpoints overlap by 85% or more and a condition that the effect caused by a viewing zone of one between two viewpoints is 5% or less, the same result as that under the viewing-zone flattening condition may be obtained in the 3D pixel line.

Figure 13:
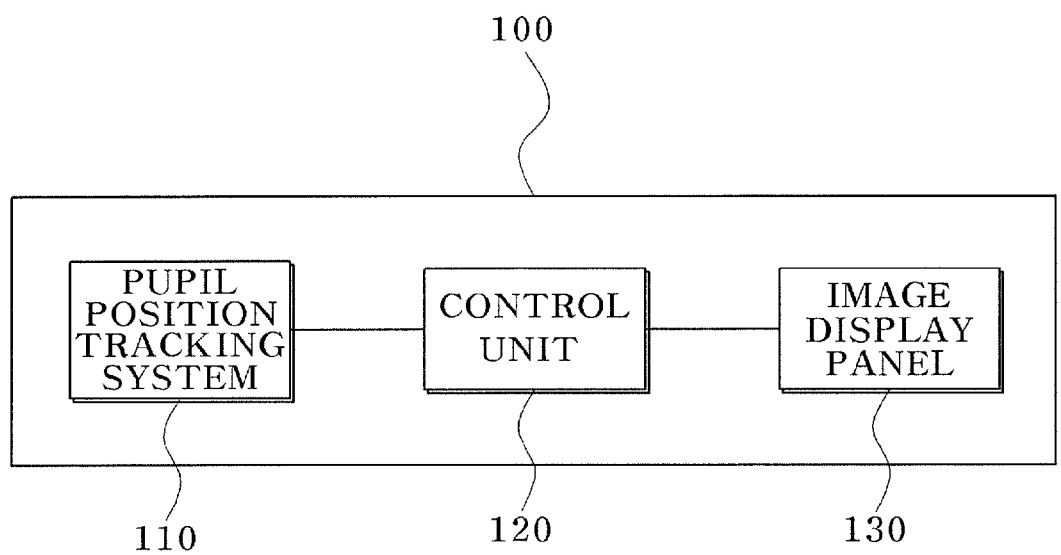
FIG. 13 is a block diagram showing a 3D image display device according to a preferred embodiment of the present invention.

When the 3D pixel line is defined as described above, the control unit 120 of the image display device 100 receives feedback about the position of the viewer's pupil from a pupil position tracking system 110 and dynamically selects a plurality of 3D pixel lines on the image display panel 130 (see FIG. 13). In addition, the control unit 120 selects, as a viewpoint corresponding to a left pupil and a viewpoint corresponding to a right pupil, viewpoints closest to the centers of the binocular pupils among the viewpoints having the 3D pixel line formed therein. Furthermore, the control unit 120 removes other viewpoint images, thereby minimizing crosstalk.

The 3D image display device using the concept of the 3D pixel line according to a preferred embodiment of the present invention will be described with reference to FIG. 13 as follows. The 3D image display device 100 according to a preferred embodiment of the present invention includes a 3D image display panel 130 and a control unit 120 configured to control a viewpoint image of each 3D pixel line. It is preferable that each 3D pixel line provide multiple viewpoints, for example, four viewpoints or more.

The 3D image display device 100 according to a preferred embodiment of the present invention further includes the pupil position tracking system 110 configured to determine a position of a viewer's pupil and deliver positional information to the control unit 120. The control unit 120 rearranges a left eye viewing zone and a right eye viewing zone for each 3D pixel line according to the viewer's eyes using the positional information delivered from the pupil position tracking system 110 and controls the image display panel 130 to provide specific image information to respective viewing zones. The control unit 120 controls an overall operation of the pupil position tracking system 110 and the image display panel 130.

The image display panel 130 may use a parallax barrier for parallax separation, a lenticular lens, or a line light source to display a 3D image. The parallax barrier or lenticular lens is a parallax separation means, which is an optical plate in which a left eye image and a right eye image are separated and alternately formed such that the viewer may view a 3D image at a certain viewing distance. The parallax barrier may have a barrier and an aperture alternatively formed therein, and the lenticular lens may have, for example, cylindrical lenses periodically formed therein. However, the parallax barrier separation means is not limited thereto. Of course, various means, such as an optical plate in which micro prisms are periodically disposed, may be used to achieve this object of the present invention. The line light source may include several types such as a line light source including point light sources for displaying a 3D image.

An image display device using a pupil position tracking system according to an embodiment of the present invention when the viewer moves in a 3D space including a depth direction and there are multiple viewers will be described below.

When the viewer leaves the optimal distance by moving back and forth, the distance between viewpoints is enlarged or reduced. If the viewer moves toward the image display device, the distance between viewpoints is reduced and the required number of viewpoints increases in consideration of the binocular distance. However, in a certain period, the shape of the viewing zone for the viewpoint remains constant.

The pupil position tracking system 110 may be applied in real time to the above-described methods using the parallax barrier or lenticular lens and the line light source for forming the viewing zone. The pupil position tracking system tracks a position of the viewer's pupil in real time and delivers positional information to the control unit 120. Then, the control unit may provide viewpoint images corresponding to both of the viewer's eyes at viewpoints corresponding to viewing-zone centers closest to the centers of both of the eyes and remove the viewpoint image other than those of the selected viewpoints using 3D information about positions of the viewer's pupils in consideration of the depth direction movement of the viewer. Thus, it is always possible to minimize the crosstalk and the brightness change in the viewing zone. Moreover, it is preferred that the provision of the viewpoint images corresponding to both of the viewer's eyes and the removal of viewer images other than those of the selected viewpoints be determined for each 3D pixel line by the control unit.

Figure 33:
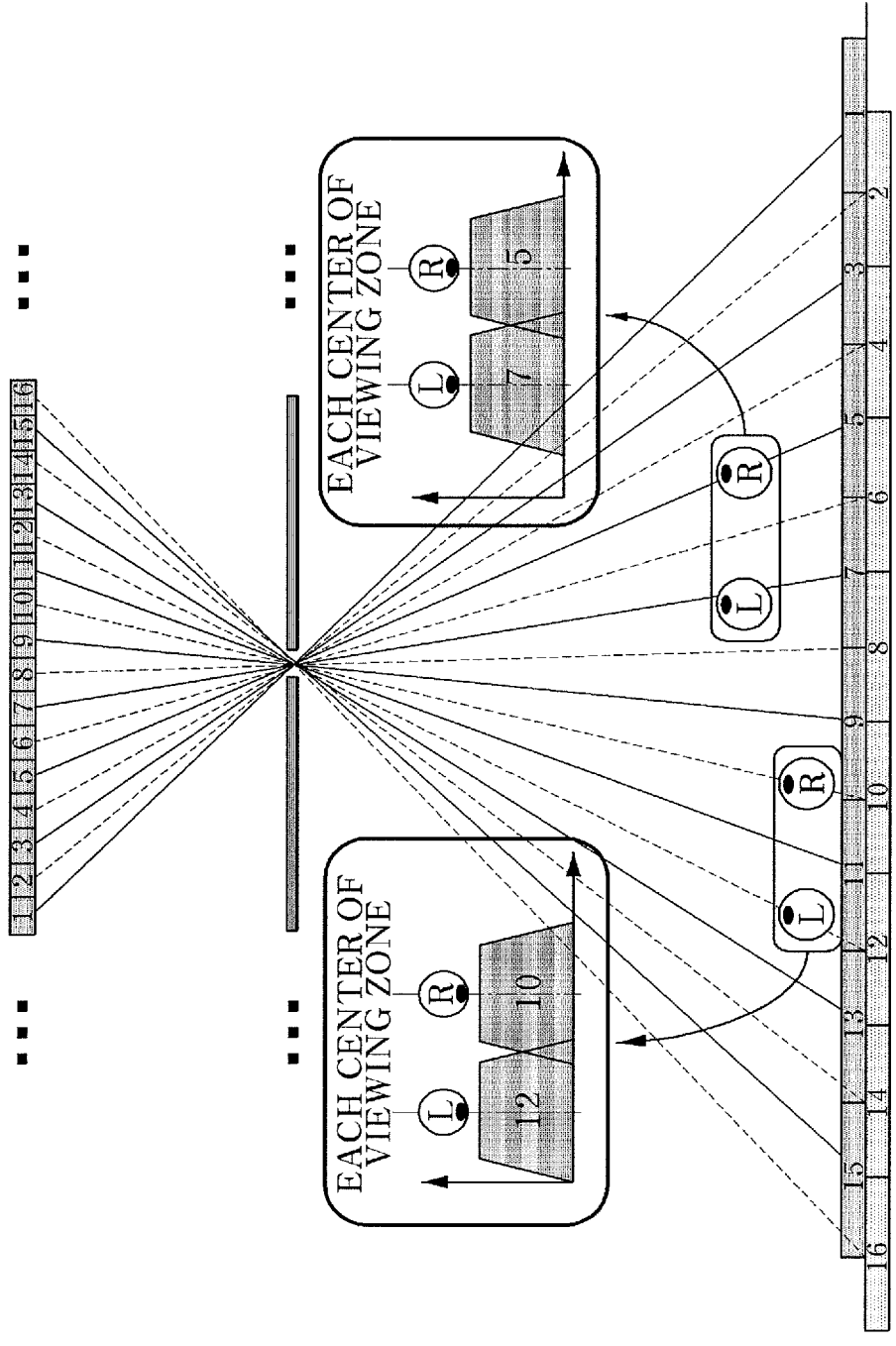
FIG. 33 is a conceptual diagram for describing a method of providing a 3D image to a plurality of viewers without mutual interference according to an embodiment of the present invention.

Furthermore, if there are multiple viewers, the method described for one person may be expanded and applied to respective viewers, thereby providing the multiple viewers with a 3D image with minimized crosstalk and less changed brightness of the viewing zone. FIG. 33 is a conceptual diagram showing a case in which one viewpoint center is designed to be positioned between the binocular viewpoints, and when the total number of viewpoints is 16, a viewing zone is formed by one 3D pixel line according to an embodiment of the present invention. In this case, it is possible to provide a 3D image in which there is no crosstalk and change in image brightness is minimized even while the viewer moves, by providing binocular viewpoint images at two viewpoints closest to the centers of both eyes of each viewer according to positions of the viewers and removing an adjacent viewpoint image or removing all other viewpoint images other than binocular viewpoint images of the viewers.

In addition, in FIG. 33, one viewpoint center is positioned between binocular viewpoints and the minimum number of viewpoints applied to one person is four, such that up to four viewers can view a 3D image at their positions. FIG. 33 illustrates a case in which, when the number of viewers is two, a flattened viewpoint is allocated to each of the viewers in the image display device according to an embodiment of the present invention. In this case, if the number of viewpoints corresponding to one person, that is, the number of viewpoint centers between binocular viewpoints, increases to four or more, it is possible to finely adjust the crosstalk.

In this case, the pupil position tracking system may track positions of the plurality of viewers and deliver information about the number of viewers and the positions of the plurality of viewers' pupils to the control unit. Then, the control unit may provide viewpoint images corresponding to both eyes of each of the plurality of viewers at viewpoints corresponding to viewing-zone centers closest to the centers of the eyes using 3D information about positions of the plurality of viewers' pupils, and may remove a corresponding viewpoint image other than those of the selected viewpoints. In this case, the provision of the viewpoint images corresponding to the eyes of the plurality of viewers and the removal of viewer images other than those of the selected viewpoints are preferably determined for each 3D pixel line, thereby minimizing crosstalk for the plurality of viewers.

Although the invention has been described with reference to exemplary embodiments, it will be understood by those skilled in the art that various changes may be made without departing from the spirit or scope of the invention. Thus, the scope of the present invention is to be determined by the following claims and their equivalents, and shall not be restricted or limited by the foregoing detailed description.

The invention claimed is:

1. A three-dimensional (3D) image display device comprising:
    an image display panel configured to display a 3D image using a parallax separation means;
    a control unit configured to control viewpoint image information; and
    a viewer position tracking system configured to determine positions of a viewer's pupils and transmit positional information to the control unit,
    wherein the image display panel provides at least four viewpoints, and determines, using the viewpoint image information, an intersection point between a viewing zone of any one of the at least four viewpoints and a viewing zone of an adjacent viewpoint;
    wherein, when the parallax separation means is a parallax barrier and N-1 viewpoint centers are spaced between two binocular viewpoints at a predetermined distance (N is an integer of 2 to 65), an aperture width of the parallax barrier is 1.6 to (2N-1) times a pixel width.

2. The 3D image display device of claim 1, wherein the image display panel displays the 3D image using a parallax barrier, a lenticular lens, or a line light source serving as the parallax separation means.

3. The 3D image display device of claim 2, wherein, in an image display panel, the control unit controls viewpoint image information for each 3D pixel line using viewing-positional information obtained through the tracking of the viewer position tracking system.

4. The 3D image display device of claim 3, wherein each 3D pixel line is formed by an aperture of the parallax separation means, and pixels on the image display panel for providing viewpoint images.

5. The 3D image display device of claim 4, wherein crosstalk is minimized by providing the viewpoint images corresponding to both eyes of the viewer at viewpoints corresponding to one or more centers of one or more viewing zones closest to the centers of both eyes of the viewer and removing any other viewpoint image other than those of selected viewpoints using 3D information about positions of the viewer's pupils, the 3D information being obtained through real-time tracking via the viewer position tracking system.

6. The 3D image display device of claim 5, wherein the providing of the viewpoint images corresponding to both eyes of the viewer and the removing of the viewpoint image other than those of the selected viewpoints are determined for each 3D pixel line to minimize crosstalk.

7. The 3D image display device of claim 5, wherein the viewer position tracking system is capable of tracking positions of a plurality of viewers and configured to track positions of each viewer's pupils and deliver information about the number of viewers and positions of the viewers' pupils to the control unit.

8. The 3D image display device of claim 7, wherein crosstalk is minimized with respect to the plurality of viewers by providing the viewpoint images corresponding to both eyes of each of the viewers at viewpoints corresponding to the one or more centers of the one or more viewing zones closest to the centers of both of the eyes of each of the viewers and removing the viewpoint image other than those of the selected viewpoints using 3D information about the positions of the plurality of viewers' pupils, the 3D information being obtained through the real-time tracking via the viewer position tracking system.

9. The 3D image display device of claim 8, wherein the providing of the viewpoint images corresponding to both eyes of each of the plurality of viewers and the removing of the viewpoint image other than those of the selected viewpoints are determined for each 3D pixel line to minimize crosstalk with respect to the plurality of viewers.

10. The 3D image display device of claim 2, wherein the parallax barrier, lenticular lens, or line light source is disposed to be inclined at a predetermined angle from a vertical line of a screen of the 3D image display device.

11. The 3D image display device of claim 10, wherein pixels of the image display device are inclined in substantially the same angle as an inclination of the aperture of the corresponding parallax barrier, line light source, or lenticular lens.

12. The 3D image display device of claim 10, wherein at least two edges of the pixels of the image display device are removed.

13. The 3D image display device of claim 1, wherein the viewer position tracking system is configured to track 3D coordinates of positions of both of the viewer's pupils by tracking the positions of the viewer's pupils or by tracking a position of the viewer's face.

14. A three-dimensional (3D) image display device comprising:
    an image display panel configured to display a 3D image using a parallax separation means;
    a control unit configured to control viewpoint image information; and
    a viewer position tracking system configured to determine positions of a viewer's pupils and transmit positional information to the control unit,
    wherein the image display panel provides at least four viewpoints, and determines, using the viewpoint image information, an intersection point between a viewing zone of any one of the at least four viewpoints and a viewing zone of an adjacent viewpoint;
    wherein, when the parallax separation means is a lenticular lens, N-1 viewpoint centers are spaced at a predetermined distance between two binocular viewpoints (N is an integer of 2 to 65), and an original focal length (fo) of the lenticular lens is a distance between the lenticular lens and pixels of the image display panel, f/fo is 0.5 to 0.9 inclusive if a focal length (f) of the lenticular lens is less than the original focal length (fo) of the lenticular lens, and f/fo is 1.06 to 20.8 inclusive if the focal length (f) of the lenticular lens is greater than the original focal length (fo) of the lenticular lens.

* * * * *